(12) United States Patent
Gonopolskiy et al.

(10) Patent No.: US 11,692,834 B2
(45) Date of Patent: Jul. 4, 2023

(54) ROUTE DETERMINATION AND NAVIGATION BASED ON MULTI-VERSION MAP REGIONS

(71) Applicant: HERE GLOBAL B.V., Eindhoven (NL)

(72) Inventors: Alex Gonopolskiy, Berlin (DE); Daniel Rolf, Berlin (DE); Tomasz Jakubowski, Berlin (DE); Mirko Maischberger, Berlin (DE)

(73) Assignee: HERE GLOBAL B.V., Eindhoven (NL)

( * ) Notice: Subject to any disclaimer, the term of this patent is extended or adjusted under 35 U.S.C. 154(b) by 928 days.

(21) Appl. No.: 16/303,543

(22) PCT Filed: Apr. 6, 2017

(86) PCT No.: PCT/EP2017/058193
§ 371 (c)(1),
(2) Date: Nov. 20, 2018

(87) PCT Pub. No.: WO2017/207143
PCT Pub. Date: Dec. 7, 2017

(65) Prior Publication Data
US 2020/0318979 A1    Oct. 8, 2020

(30) Foreign Application Priority Data
May 31, 2016  (EP) .................................. 16172209

(51) Int. Cl.
*G01C 21/34*    (2006.01)
*G01C 21/00*    (2006.01)

(52) U.S. Cl.
CPC ....... *G01C 21/3446* (2013.01); *G01C 21/387* (2020.08)

(58) Field of Classification Search
CPC ..... G01C 21/3446; G01C 21/32; G01C 21/34
See application file for complete search history.

(56) References Cited

U.S. PATENT DOCUMENTS

| 7,877,203 B2 * | 1/2011 | Mikuriya | ............... | G06F 16/29 |
| | | | | 701/450 |
| 2005/0270306 A1 * | 12/2005 | Nomura | ............... | G09B 29/003 |
| | | | | 345/619 |

(Continued)

FOREIGN PATENT DOCUMENTS

| EP | 2 053 357 A1 | 4/2009 |
| WO | 2017207143 A1 | 12/2017 |

OTHER PUBLICATIONS

First Examination Report for related New Zealand Patent IP No. 748160 dated Jun. 28, 2019, 4 pages.

(Continued)

*Primary Examiner* — Hunter B Lonsberry
(74) *Attorney, Agent, or Firm* — Peter H. Yu; Here Global B.V.

(57) ABSTRACT

A method for: obtaining route request information characterizing a route to be provided to a terminal; determining, at least partially based on the route request information, an intermediate route comprising a plurality of link identifiers respectively identifying links in respective current versions of map regions; determining a final route by replacing, in the intermediate route, link identifiers by respective indications, wherein each indication of the indications respectively indicates whether or not a link or considered-to-be-suited link corresponding to a link, which is identified by the link identifier replaced by the indication and which is contained in a current version of a map region, is considered to be contained in a non-current-version of the map region available to the terminal, wherein the considered-to-be-suited- (Continued)

link is a link that is considered to be suited to be used for a route guiding process at the terminal; and outputting the final route.

20 Claims, 6 Drawing Sheets

(56) References Cited

U.S. PATENT DOCUMENTS

| | | | |
|---|---|---|---|
| 2010/0204917 A1* | 8/2010 | Tanabe | G09B 29/106 701/533 |
| 2011/0179080 A1* | 7/2011 | Miyazaki | G06F 16/29 707/772 |
| 2015/0088415 A1* | 3/2015 | Kato | G01C 21/3673 701/454 |
| 2015/0247732 A1 | 9/2015 | Yano et al. | |
| 2019/0011265 A1* | 1/2019 | Iwata | G01C 21/20 |

OTHER PUBLICATIONS

International Search Report and Written Opinion for related International Application No. PCT/EP2017/0588193, dated Jul. 18, 2017, 10 pages.

European Office Action for related European Patent Application No. 16172209.5-1003 dated Jul. 16, 2019, 6 Pages.

Office Action for related Australian Patent Application No. 2017273575, dated Apr. 20, 2019, 3 pages.

* cited by examiner

ROUTE DETERMINATION AND NAVIGATION BASED ON MULTI-VERSION MAP REGIONS

CROSS-REFERENCES TO RELATED APPLICATIONS

This application claims priority from PCT Application Serial No. PCT/EP2017/058 193, entitled "Route Determination and Navigation based on Multi-Version Map Regions," filed on Apr. 6, 2017, which claims priority from European Patent Application No. 16172209.5, filed on May 31, 2016, the contents of which are hereby incorporated herein in their entirety by this reference.

FIELD OF THE DISCLOSURE

The invention relates to the field of navigation, and in particular relates to determination of a route and navigation of this route based on different versions of one or more map regions.

BACKGROUND

Nowadays different approaches exist to determine a route that shall be navigated by a terminal, such as for instance a car-mounted navigation system or a hand-held navigation device. The route may for instance be determined locally at the terminal, based on a map (e.g. in the form of several map regions) that is locally stored at the terminal. The route itself may for instance comprise a plurality of link identifiers that respectively identify links (e.g. roads, intersections, etc.) contained in the terminal's map. The drawback of this approach is that the locally stored map has to be updated regularly to prevent it from becoming outdated. Since the update patches required for updating are comparably large, transmission via wireless networks requires a lot of bandwidth and/or transmission time.

SUMMARY OF SOME EXAMPLE EMBODIMENTS OF THE INVENTION

As an alternative, the route may be determined by one or more servers (e.g. in the form of a cloud), e.g. upon request by the terminal, and may then be transmitted to the terminal to enable the terminal to navigate the route. A vast advantage of this approach is that the server(s) may have most recent versions of the map available and may thus determine an optimum or close-to-optimum route, potentially further considering information such as traffic and/or weather information that is available and up-to-date at the server. When such a server-determined route shall be navigated by the terminal, the terminal has to match the link identifiers comprised in the route to links in the map that is available at the terminal, which map will generally have an older version than the map that was used at the server to determine the route.

One possible solution for this problem is that the terminal, when receiving a route determined by the server based on a current version of a map and comprising link identifiers that identify links in this current version of the map that is not yet available to the terminal, updates at least those regions of the map (or even the entire map) that comprise these links. This would however require the terminal to check, upon reception of each server-determined route, if this route requires updating of at least a region of the map that is available to the terminal, and to update this region before being able to navigate the route. This would disadvantageously slow down the navigation process.

It is thus, inter alia, an object of the present invention to provide a solution in which a route can be determined based on a respective current version of one or more map regions and can be guided/navigated by a terminal that has, for one or more of these map regions, respective non-current versions only.

According to a first exemplary aspect of the invention, a method is disclosed, the method comprising:
  obtaining route request information characterizing a route to be provided to a terminal;
  determining, at least partially based on the route request information, an intermediate route comprising a plurality of link identifiers respectively identifying links in respective current versions of one or more map regions;
  determining a final route by replacing, in the intermediate route, one or more link identifiers by respective indications,
  wherein each indication of the indications respectively indicates whether or not a link or considered-to-be-suited link corresponding to a link, which is identified by the link identifier replaced by the indication and which is contained in a current version of a map region, is considered to be contained in a non-current-version of the map region available to the terminal, wherein the considered-to-be-suited link is a link that is considered to be suited to be used for a route guiding process at the terminal; and
  outputting the final route.

This method may for instance be performed and/or controlled by an apparatus, e.g. a server. Alternatively, this method may be performed and/or controlled by more than one apparatus, e.g. a server cloud comprising at least two servers.

According to a further exemplary aspect of the invention, a computer program is disclosed, the computer program when executed by a processor causing an apparatus (e.g. a server) to perform and/or control the actions of the method according to the first exemplary aspect of the invention.

The computer program may be stored on computer-readable storage medium, in particular a tangible and/or non-transitory medium. The computer readable storage medium could for example be a disk or a memory or the like. The computer program could be stored in the computer readable storage medium in the form of instructions encoding the computer-readable storage medium. The computer readable storage medium may be intended for taking part in the operation of a device, like an internal or external memory (e.g. a Read-Only Memory (ROM)) or hard disk of a computer, or be intended for distribution of the program, like an optical disc.

According to a further exemplary aspect of the invention, an apparatus is disclosed, configured to perform and/or control or comprising respective means for performing and/or controlling the method according to the first exemplary aspect of the invention.

The means of the apparatus can be implemented in hardware and/or software. They may comprise for instance at least one processor for executing computer program code for performing the required functions, at least one memory storing the program code, or both. Alternatively, they could comprise for instance circuitry that is designed to implement the required functions, for instance implemented in a chipset or a chip, like an integrated circuit. In general, the means may comprise for instance one or more processing means or processors.

According to a further exemplary aspect of the invention, an apparatus is disclosed, comprising at least one processor and at least one memory including computer program code, the at least one memory and the computer program code configured to, with the at least one processor, cause an apparatus (e.g. the apparatus) at least to perform and/or control the method according to the first exemplary aspect of the invention.

The above-disclosed apparatus according to any aspect of the invention may be a module or a component for a device, for example a chip. Alternatively, the disclosed apparatus according to any aspect of the invention may be a device, for instance a server or server cloud. The disclosed apparatus according to any aspect of the invention may comprise only the disclosed components (e.g. means, processor, memory) or may further comprise one or more additional components.

According to a further exemplary aspect of the invention, a system is disclosed, comprising: an apparatus according to any aspect of the invention as disclosed above, and the terminal, wherein the terminal is configured to receive the final route and to conduct a route guiding process at least based on the final route and at least respective non-current versions of one or more map region(s) available to the terminal that respectively contain, according to the one or more indications, a link or considered-to-be-suited link corresponding to a link that is contained in a respective current version of the respective map region and is identified by a respective link identifier comprised in the intermediate route.

In the following, exemplary features and exemplary embodiments of all aspects of the present invention will be described in further detail.

The route request information may for instance stem from the terminal. It may for instance be received from the terminal, or from another entity. The route request information may alternatively stem from an entity that is different from the terminal, e.g. a server or computer. The entity may for instance desire a route to be determined according to the route request information and to be provided to the terminal. The route request information may for instance comprise a start position and a target position of a desired route (e.g. in coordinates such as for instance latitude/longitude coordinates, or by means of postal addresses). Additionally or alternatively, the route request information may for instance comprise a start link identifier identifying a start link in a map region (that is e.g. available to the terminal) and a target link identifier identifying a target link in a map region (that is e.g. available to the terminal). The route request information may for instance comprise further parameters to be considered in the calculation of the route, such as for instance a type of route that is desired, such as for instance "quickest route", "shortest route", "scenic route", "route without toll roads", "route without ferry boats" etc. The route request information may for instance further comprise information on the respective version of one or more map regions that are available to the terminal. For instance, the respective version of all map regions that are available to the terminal may be comprised in the route request information, or only the respective version of a part of the map regions that are available to the terminal, e.g. of only those map regions through which the route will lead.

The terminal may for instance be an electronic device. The electronic device may for instance be portable (e.g. weigh less than 5, 3, 2 or 1 kg). The electronic device may for instance be at least temporarily (e.g. in removable form) or permanently installed in a vehicle. The vehicle may for instance be a car, a truck, a motorcycle, a bicycle, a boat or a plane, to name but a few examples. The electronic device may for instance comprise or be connectable to a display for displaying a route that is guided/navigated to a user. The electronic device may for instance comprise or be connectable to means for outputting sound, e.g. in the form of spoken commands or information. The electronic device may for instance comprise or be connectable to one or more sensors for determining the devices position, such as for instance a Global Navigation Satellite System (GNSS) receiver, e.g. in the form of a Global Positioning System (GPS) receiver.

To the terminal, one or more map regions are available. These map regions are for instance parts of a larger map. These parts may for instance pertain to different geographic regions (e.g. to different countries (e.g. like Germany, France, Spain etc.) or different parts of countries (e.g. like Germany North, Germany East, etc.)), or to different geometric regions into which a map has been divided, e.g. by a regular grid (the map regions may then for instance be (e.g. quadratic) tiles). The map regions are for instance available to the terminal by being stored in or at the terminal, or by being accessible by the terminal, e.g. via a wireless or wire-bound connection e.g. to an apparatus that stores the map regions. This apparatus may be remote from the terminal or may be included with the terminal into one device, e.g. into a vehicle. Only one version of a map region may be available (e.g. stored in or on) the terminal at a time. The map regions may for instance comprise links that are identifiable by respective link identifiers. The links may for instance be navigable links. The links may for instance be roads, intersections, etc. The links may for instance constitute parts of a road network. The links are for instance represented by link data objects that comprise information on the links, such as for instance a link identifier and one or more attributes (also denoted as link attributes herein). Non-limiting examples of such attributes are: street name (e.g. Invalidenstrasse), route name (e.g. A1), route name level (2), speed limit, country code, state code, geometry, elevation, junction info, number of lanes, time dependent restrictions, timezone offset, dst spec, segment length, car open, truck attributes, direction of travel, functional class (e.g. a classification for importance of roads (e.g. 1=German Autobahn, 2=German Bundesstrasse, 3=German Landstrasse). Further example attributes are information on the map region in which the link is located, information on a version of the map region in which the link is located, a start point, and end point, and information on further links connected to a respective link (so-called connectivity information). The link identifiers may for instance be unique with respect to all map regions of the same version. In this case, it may for instance not absolutely be necessary to have information on the map region in which the link is located in the link data objects.

At least partially based on the route request information, an intermediate route is determined. The intermediate route is in particular determined based on respective current versions of one or more map regions. In the determining of the intermediate route, in particular no non-current version of a map region may be used. Whether one or more map regions are required depends on the extension of the route. It may for instance be that a route has both the start position and end position within the same map region, and then this map region will be used for determining the intermediate route. The determining is for instance performed by a server or server cloud that has the respective current (e.g. most up-to-date) versions of the one or more map regions available. The intermediate route comprises a plurality of link identifiers respectively identifying links in the current versions of the one or more map regions. Characteristics of the link identifiers and of the links have already been described above and also apply here. The intermediate route may for instance comprise further information.

A final route is then determined by replacing, in the intermediate route, one or more link identifiers by respective indications. Therein, it may for instance be the case that all link identifiers may be replaced by respective indications, for instance in a case where the intermediate route is based on links in a current version of a map region of which only a non-current version is available to the terminal. The one or more replaced link identifiers may for instance identify links in the respective current versions of the one or more map regions that are available to the terminal only as non-current versions. A non-current version of a map region is understood as a version of the map region that is older than the current version of the map region. The non-current version may be the immediately preceding version of the current version, or may be an earlier version. The non-current version of the map region differs from the current region of the map region, for instance with respect to the links contained in both versions. Links may for instance have been removed, added and/or changed when migrating from the non-current version of the map region to the current version of the map region. In addition, the final route may comprise one or more link identifiers that respectively identify links that are contained in current versions of one or more map regions that are available to the terminal. The final route may, for each link identifier and/or indication, comprise one or more link attributes (e.g. one or more of the link attributes described above). These link attributes may for instance be used to determine a surrogate link, as will be described in further detail below.

Each indication of the one or more indications respectively indicates whether or not a link or a considered-to-be-suited link corresponding to (for instance equaling, or equaling at least in one or more pre-defined aspects) a link—which is identified by the link identifier replaced by the indication and which is contained in a current version of a map region—is considered to be contained in a non-current-version of the map region available to the terminal. For the expression "link or considered-to-be-suited link", in the following, also the expression "link/considered-to-be-suited link" will be used.

Therein, each indication pertains to another link identifier of the intermediate route. These link identifiers to which the indications respectively pertain may respectively identify links in the same map region or in at least two or more different map regions. In the most general case, each of these link identifiers identifies a respective link in respectively different map regions.

The indication thus may be considered to express a result of a consideration whether or not it is considered that a link/considered-to-be-suited link exists in the non-current version of the map region (available to the terminal) that corresponds to (for instance equals, or equals at least in one or more pre-defined aspects) the link identified by the replaced link identifier in the intermediate route. The indication may for instance comprise the link identifier of the link/considered-to-be-suited link in the non-current version of the map region, if it is considered that a link/considered-to-be-suited link exists in the non-current version of the map region that corresponds to the link identified by the replaced link identifier in the intermediate route, and may be empty or comprise a pre-defined value (e.g. "NONE"), if it is considered that a link/considered-to-be-suited link does not exist in the non-current version of the map region that corresponds to the link identified by the replaced link identifier in the intermediate route. The final route may then for instance comprise, as the replaced link identifiers, link identifiers pertaining to links in respective non-current versions of one or more map regions available to the terminal, or the empty indications/pre-defined values (e.g. "NONE"). The terminal, when conducting a route guiding process based on such a final route, can use the indications to either fetch links from the non-current versions of the one or more map regions that are available to the terminal (in case the indications comprise link identifiers identifying links in the non-current versions of the one or more map regions) or determine a surrogate link (in case the indications are left empty or comprise pre-defined values), as will be further detailed below. Of course, if the terminal also comprises one or more current-version map regions, link identifiers in the intermediate route that identify links in these current-version map regions are not replaced when determining the final route and can be used by the terminal when navigating the route by referring to these current-version map regions.

The indication either pertains to
(i) a result of a consideration whether or not it is considered that a link exists (e.g. at all) in the non-current version of the map region that corresponds to the link that is comprised in the current version of the map region and that is identified by a link identifier in the intermediate route, or to
(ii) a result of a consideration whether or not it is considered that a considered-to-be-suited link exists in the non-current version of the map region that corresponds to the link that is comprised in the current version of the map region and that is identified by a link identifier in the intermediate route.

Therein, the considered-to-be-suited link is a link that is considered (e.g. by an apparatus according to an exemplary aspect of the present invention as described above) to be suited to be used for the route guiding process at the terminal.

The considered-to-be-suited link is for instance considered to be suited to be used for the route guiding process at the terminal if the link has not been flagged as unsuited (e.g. erroneous or otherwise problematic, e.g. in a database that is e.g. based on feed-back from terminals and/or sensors) and/or if no information is available that is indicative of the link being at least partially erroneous or problematic.

Which of the above-described two types (i) or (ii) of indications is used may for instance depend on how the final route is determined. In the first case, it is only checked whether a link is contained in the non-current version of the map region available to the terminal at all that corresponds to the link in the intermediate route. In the second case, it is checked whether a link is contained in the non-current version of the map region available to the terminal that corresponds to the link in the intermediate route, and whether this link is considered to be suited for the route guiding process at the terminal. This suitability may for instance be checked based on a database that contains information on one or more links in the non-current version of the map region that are considered to be not suited to be used for the route guiding process at the terminal, for instance because one or more terminals and/or one or more sensors (e.g. of test vehicles that check an accuracy of route guiding processes against the real world scenario) have reported problems or errors with these one or more links before.

From a perspective of the terminal that obtains the final route, it may not be differentiable which of the above-described two types (i) and (ii) of indications has been used when determining the final route, in particular if in both cases, the same format for the indications (and the optional consideration information described further below) is used. The terminal may for instance only be informed by the indications if a link from a non-current version of a map region available to the terminal shall be used by the terminal for the route guiding process or not, and may not be aware of whether a consideration from which this information resulted also considered the suitability of this link for the route guiding process or only considered if a link corresponding to a link of the current version of the map region and identified by a link identifier of the intermediate route is contained in the non-current version of the map region available to the terminal at all.

The second type (ii) of indication described above may thus advantageously be used (e.g. by an apparatus according to an exemplary aspect of the present invention as described above) to force a specific behavior at the terminal: in case of links that are actually considered to be contained in non-current versions of map regions available to the terminal, but which are considered to be non-suited for the route guiding process at the terminal, a negative indication instead of a positive indication is included into the final route, which e.g. results in these links not to be used by the terminal (e.g. instead, surrogate links will be used by the terminal for the route guiding process, which are for instance based on information provided in the final route, e.g. in the form of link attributes).

A second final route that comprises indications of the second type may for instance be obtained from a first final route that comprises indications of the first type by the following steps (which may for instance form part of the method according to the first exemplary aspect of the present invention):

identifying those indications contained in the first final route that respectively indicate that a link exists in a non-current version of a map region that corresponds to the link that is comprised in the current version of the map region and that is identified by a link identifier in the intermediate route (for instance by checking, if this indication identifies a link in the non-current version of the map region), checking, for these identified indications, if they pertain to links that are not considered suited to be used for the route guiding process at the terminal (e.g. based on a database), and modifying those identified indications, for which the check is positive, in a way that they indicate that a link does not exist in a non-current version of a map region that corresponds to the link that is comprised in the current version of the map region and that is identified by a link identifier in the intermediate route.

In this way, all indications contained in the second final route now pertain to suited-to-be-considered links, irrespective of whether they have been modified or not. It is understood that this processing can either be performed after the first final route has been completely determined, or at least partially in parallel with the determining of the first final route.

The final route is then output, e.g. to the terminal or to another apparatus that transfers the final route to the terminal.

At the terminal, a route guiding process may then be conducted (e.g. by the terminal or by components thereof). The route guiding process is at least based on the final route and at least respective non-current versions of one or more map regions (e.g. a non-current version of a map region or respective non-current versions of at least two map regions) available to the terminal that respectively contain, according to the one or more indications, a link/considered-to-be-suited link corresponding to a link that is contained in a respective current version of the respective map region and is identified by a respective link identifier comprised in the intermediate route. The route guiding process is for instance a process in which a user of the terminal or an apparatus comprising the terminal (e.g. an at least partially autonomously driving vehicle) is guided along a route that is based on the final route (e.g. a route derived from or representing the final route). Conducting the route guiding process may for instance comprise outputting representations of links and/or of information of links to which the final route pertains (e.g. that are identified by the final route), e.g. in visual and/or acoustic and/or haptic form, in particular in a way that is perceivable by a user of the terminal and/or in a form that is understandable by an apparatus (e.g. a vehicle) that comprises the terminal. Therein, for instance a current position of the terminal may be considered (in particular with respect to the links) and for instance output in visual and/or acoustic and/or haptic form. Additionally or alternatively, navigation instructions may be output, e.g. in visual and/or acoustic and/or haptic form and/or as control signals, e.g. to actuators of a vehicle, which may for instance be an at least partially autonomously driving vehicle. Conducting the route guiding process may for instance further comprise (at least with respect to links that are contained in current and non-current versions of map regions available to the terminal) displaying a map background with further information that extends beyond the information of the links, e.g. further information such as points of interest, buildings, topography, etc. Information on the map background may for instance be stored, together with the links, in the (current and non-current versions of the) map regions.

The terminal, for conducting the route guiding process, may use the indications to either fetch links from the non-current versions of the one or more map regions that are available to the terminal (in case the indications comprise link identifiers identifying links in the non-current versions of the one or more map regions available to the terminal) or for instance use surrogate links (in case the indications are left empty or comprise pre-defined values), which may for instance be determined based on information comprised in the final route (e.g. respective attributes of links/considered-to-be-suited links that are indicated by respective indications not to be considered to be contained in respective non-current versions of map regions available to the terminal). Of course, if the terminal also comprises one or more current-version map regions, link identifiers in the final route that identify links in these current-version map regions are used by the terminal for conducting the route guiding process by referring to these current-version map regions.

Example embodiments of the invention thus make it possible to determine (e.g. at a server or server cloud) an intermediate route based on current-version map regions, and to transform this intermediate route into a final route that can be used at a terminal to which at least one or more of these map regions are available only as non-current (e.g.

older) versions to conduct a route guiding process. The link identifiers of links of the current-version map regions that are considered to be contained in the respective non-current-version map regions available to the terminal can for instance be mapped (by means of the indications) into link identifiers of links in the non-current-version map regions, and the link identifiers of links of the current-version map regions that are considered to be not contained in the respective non-current-version map regions available to the terminal (or that are, according to an example embodiment, considered to be not suited to be used in the route guiding process at the terminal, e.g. since they are erroneous or problematic) can for instance be removed from the final route by representing them by an empty spot or by a pre-defined value that indicates to the terminal that the terminal does not have this link available and has to perform some special processing (e.g. use a surrogate link) when conducting a route guiding process based on the final route.

Thus both the amount of different versions of map regions that have to be maintained at an apparatus (e.g. by an apparatus according to an exemplary aspect of the present invention as described above, e.g. a server or server cloud) that determines routes for terminals as well as the frequency of map region updates that have to be performed by the terminals is reduced significantly. Instead of plural versions of map regions, it may for instance be sufficient to maintain, at the apparatus that determines routes for terminals, only the current version of each map region and according mapping tables that describe mapping of links from the current versions of the map regions to previous versions as described above, which are much less in size. Furthermore, it is not necessary that a terminal that receives a route that is based on a plurality of links of which only a few are contained in current versions of one or more map regions that are not yet available to the terminal is excluded from navigating this route entirely, or has to download current versions of all map regions that are touched by the route. Instead, the route is "translated", by using the indications, to for instance best match the versions of the map region(s) that are available to the terminal.

Links of this translated route that are available to the terminal can then be retrieved from the respective current or non-current versions of map regions available to the terminal, and can thus for instance be presented (e.g. visually and/or acoustically) with map background information (e.g. points of interest, buildings, topography) also stored in the respective current or non-current versions of the map regions and optimally adapted to the links stored in the current or non-current versions of the map regions.

Links of this translated route that are not available to the terminal, since they are only contained in current versions of one or more map regions (or are, according to an example embodiment, considered by the apparatus that determines the final route to be unsuited for the route guiding process), may then for instance be substituted by surrogate links (that are e.g. based on information comprised in the final route and thus are up-to-date) at the terminal and may thus only cause insignificant degradation of the user experience, in particular if only a small number of such links is concerned. The user experience may for instance be degraded since no map background information may be presentable together with the surrogate links, or the map background information available (e.g. from a non-current version of a map region available to the terminal) may not be optimally adapted to the surrogate links (e.g. since changes in the links are only reflected by the surrogate links that are based on information from the current version of a map region, while the map background information is based on a non-current version of the map region).

It should be noted that the step of determining the intermediate route and the step of determining the final route can take place in parallel. For instance, after determining of a link identifier for the intermediate route (and before the determining of the next link identifier of the intermediate route), it may be checked whether this link identifier has to be replaced by an indication, and in case the check is positive, the link identifier may be replaced (and otherwise kept to form part of the final route). The final route may then for instance be step-wise developed from the intermediate route, and the intermediate route may then for instance never exist as a whole, but merely be represented by the respective link identifier that is currently determined and then either copied into the final route or replaced by an indication. Alternatively, the step of determining the final route may take place after the step of determining the intermediate route has completed.

According to an exemplary embodiment of all aspects of the present invention, in case that a link/considered-to-be-suited link corresponding to a link, which is identified by the link identifier replaced by the indication and which is contained in a current version of a map region, is considered to be contained in the non-current version of the map region, the indication comprises or consists of a link identifier identifying this link/considered-to-be-suited link considered to be contained in the non-current version of the map region. This indication in the form of a link identifier may thus be used by the terminal to select a link/considered-to-be-suited link from the non-current version of the map region available to the terminal. From the perspective of the terminal, such an indication may not appear different from a link identifier received in a final route that has been determined based on the non-current version (or the current version) of the map region available to the terminal. The link identifier identifying this link considered to be contained in the non-current version of the map region may be different from the link identifier comprised in the intermediate route and identifying the link contained in the current version of the map region (although both links are otherwise considered to be equal), or may be the same.

According to an exemplary embodiment of all aspects of the present invention, in case that a link/considered-to-be-suited link corresponding to a link, which is identified by the link identifier replaced by the indication and which is contained in a current version of a map region, is not considered to be contained in the non-current version of the map region, a predefined (e.g. constant) or empty information is contained in or constitutes the indication. The pre-defined information may for instance be a pre-defined value or variable, e.g. "NONE", "N/A" or "0000", to name but a few examples. The empty information may for instance require less (e.g. zero) bits for its representation than a pre-defined information. It may then nevertheless have to be safeguarded that it is clear for the terminal that an indication (with empty information) replacing a link identifier is present, e.g. by using start codes indicating the start of a new link identifier/indication in the final route, or by using field length indicators for each link identifier/indication in the final route. The predefined or empty information may indicate to the terminal that the present segment of the route (as represented by the indication that replaces a link identifier) is not contained as link/considered-to-be-suited link in a (non-current version of a) map region available to the terminal, so that a special processing is necessary, for instance by using a surrogate link.

According to an exemplary embodiment of all aspects of the present invention, each indication of the indications is associated with respective consideration information pertaining to the consideration whether or not a link/considered-to-be-suited link corresponding to a link, which is identified by the link identifier replaced by the indication and which is contained in a current version of a map region, is considered to be contained in a non-current version of the map region. While the consideration itself may be of binary nature (i.e. it is considered that a corresponding link is contained in the non-current version of the map region or not), the consideration information may provide further information concerning this consideration, e.g. with which certainty, accuracy or under which circumstances the consideration was made. The consideration information may advantageously be exploited at the terminal for conducting the route guiding process, as will be further detailed below. For instance, it may be conveyed to the terminal that no perfectly matching corresponding link/considered-to-be-suited link is contained in the non-current version of a map region available to the terminal, but that a close match (e.g. with only slightly different geometry) is present that could potentially be used for navigating the final route. Therein, the consideration information may for instance pertain to the consideration whether or not a link/considered-to-be-suited link corresponding to the link identified by a link identifier of the intermediate route and contained in the current version of the map region is contained in the non-current version of the map region available to the terminal, and not to the consideration whether or not a link is suited to be used in the route guiding process at the terminal.

The respective consideration information may for instance be indicative of a certainty of the respective consideration. Additionally or alternatively, the respective consideration information, together with the respective indication it is associated with or alone, indicates a graduation of the respective consideration with more than two levels. For instance, if the consideration information is represented by a binary value, the indication (which expresses the outcome of the consideration in binary nature) together with the binary consideration information allows differentiating between four different levels, i.e. yields a graduation with four levels. Two of these levels may for instance represent that no corresponding link/considered-to-be-suited link is contained in the non-current version of the map region, and the other two levels may for instance represent that a corresponding link/considered-to-be-suited link is contained in the non-current version of the map region. Within these two levels, respectively, the consideration information allows for a further differentiation. It can for instance be expressed that the respective considerations have been made with a high or low certainty. Alternatively, these four levels may be represented by the consideration information alone, e.g. if the consideration information is represented by two binary values.

The respective consideration information, together with the respective indication it is associated with or alone, may for instance indicate a graduation of the respective consideration with one or more of the following four levels:

a first level indicating that no link/considered-to-be-suited link corresponding to a link, which is identified by the link identifier replaced by the indication and which is contained in a current version of a map region, is considered to be contained in a non-current version of the map region available to the terminal;

a second level indicating that no link/considered-to-be-suited link corresponding to a link, which is identified by the link identifier replaced by the indication and which is contained in a current version of a map region, is considered to be contained in a non-current version of the map region available to the terminal, but that at least one link/considered-to-be-suited link that is at the same position as or at least within a pre-defined distance from or comprises at least a link portion also contained in the link, which is identified by the link identifier replaced by the indication and which is contained in a current version of the map region, is considered to be contained in the respective non-current-version map region available to the terminal;

a third level indicating that a link/considered-to-be-suited link corresponding to a link, which is identified by the link identifier replaced by the indication and which is contained in a current version of a map region, is considered to be contained in a non-current version of the map region available to the terminal, although at least one characteristic (e.g. an attribute and/or a connectivity, but e.g. not a geometry and/or position) of both links differs;

a fourth level indicating that a link/considered-to-be-suited link corresponding to a link, which is identified by the link identifier replaced by the indication and which is contained in a current version of a map region, is considered to be contained in a non-current version of the map region available to the terminal.

In this example, thus the first and second levels represent that no corresponding link/considered-to-be-suited link is contained in the non-current version of the map region, and the third and fourth levels represent that a corresponding link/considered-to-be-suited link is contained in the non-current version of the map region. This can be represented by proper choice of the indication (which expresses the outcome of the consideration in binary nature). Furthermore, a differentiation between the first and second level, and between the third and fourth level, is for instance possible by the consideration information, even if it can take only two different values.

According to the second level, the link/considered-to-be-suited link that is at the same position as or at least within a pre-defined distance from or comprises at least a part also contained in the link that is contained in the current version of a map region may for instance be a part of a link that has been split (when stepping from the non-current version of the map region to the current version) or a link that has been merged with another link (when stepping from the non-current version of the map region to the current version). The respective consideration information may for instance only be able to represent two different values. Non-limiting examples of such value-pairs are TRUE/FALSE or HIGH/LOW. The consideration information may then for instance only comprise one bit.

According to an example embodiment of all aspects of the present invention, at least one of the indications (or for instance each of the indications respectively) is determined based on one or more mapping tables that assign, to a plurality of link identifiers that respectively identify links in a current-version of a map region, respective indications respectively indicating whether or not a link/considered-to-be-suited link corresponding to a link of the plurality of link identifiers is considered to be contained in a non-current version of the map region (that is available to the terminal).

Mapping tables may be specific for a map region and/or for the non-current version of the map region. There may for instance be one mapping table for each older version of a map region that allows mapping of link identifiers from the current version of the map region to indications (inter alia link identifiers) in the non-current version of the map region. Alternatively, mapping tables may only allow mapping of link identifiers from a version of the map region to the immediately preceding version of the map region. Then, when it shall be determined whether a link in a current version of a map region corresponds to a link in a non-current version of the map region that is not immediately preceding the current version of the map region (e.g. is version 3, while the current version is version 5), more than one mapping table has to be used in an iterative sense. A first mapping table may thus be used to get from the current, first version of the map region to the immediately preceding, second version, and a second mapping table to get from this second version to a third version that immediately precedes this second version.

When determining the final route from the intermediate route, for each link identifier of the intermediate route that is known to identify a link in a current version of a map region of which only a non-current version is available to the terminal, a mapping table corresponding to this map region and to the non-current version of this map region (or several mapping tables in case of iterative application of mapping tables) may be deployed to identify the indication to be used when replacing the link identifier.

The one or more mapping tables may for instance be stored or be available to an apparatus that performs at least the determining of the final route before the determining of the final route. The one or more mapping tables may for instance be used for determining a plurality of different final routes from respectively different intermediate routes. In this way, the indications can be simply determined from the one or more mapping tables and do not have to be determined anew each time. This saves computation time, since searching for corresponding links in different versions of a map region is a computationally extensive task. Mapping tables may for instance be generated when a new version of a map region becomes available for use by an apparatus that performs at least the determining of the intermediate route.

The one or more mapping tables may assign, to a plurality of link identifiers that respectively identify links in a current-version of a map region, respective indications respectively indicating whether or not a link corresponding to a link of the plurality of link identifiers is considered to be contained in a non-current version of the map region (that is available to the terminal), or may assign, to a plurality of link identifiers that respectively identify links in a current-version of a map region, respective indications respectively indicating whether or not a considered-to-be-suited link corresponding to a link of the plurality of link identifiers is considered to be contained in a non-current version of the map region (that is available to the terminal). Thus in the latter case, the one or more mapping tables also already include an assessment of the suitability of the link for use for the route guiding process at the terminal. In contrast, in the former case, such an assessment is not included (but may be associated with the respective indications in a subsequent processing step based on a database with suitability information).

The mapping table may for instance not contain information assigning an indication to a link identifier in case of indications that respectively indicate that a link/considered-to-be-suited link corresponding to a link identified by the link identifier is considered to be contained in a non-current version of the map region, or may not contain information assigning an indication to a link identifier in case of indications that respectively indicate that a link/considered-to-be-suited link corresponding to a link identified by the link identifier is not considered to be contained in a non-current version of the map region. In this way, advantageously storage space can be saved.

For instance, if most of the links of a current version of a map region are also contained in a non-current (e.g. immediately previous) version of the map region, the mapping table does not have to comprise explicit assignment information on these links in the form of indications. This information may be rather inferred from the fact that no indication is present. If the mapping table is accessed to retrieve an indication for a link identifier pertaining to a current version of a map region, it can e.g. be inferred from the absence of assignment information (e.g. absence of an indication) for this link identifier in the mapping table that the link is contained in a one-to-one fashion in the non-current version of the map region with the same link identifier. Alternatively, if there has been a lot of change between two versions of a map region, it may be more efficient to dispense, in the mapping table, with assignment information indicating that a link in the current version of a map region identified by a link identifier is not considered to have a corresponding link/considered-to-be-suited link in the non-current version of the map region.

In embodiments of all aspects of the invention, where the indications are associated with respective consideration information, at least one of the indications and its associated consideration information may be determined based on one or more mapping tables that assign, to a plurality of link identifiers that respectively identify links in a current-version of a map region, respective indications respectively indicating whether or not a link/considered-to-be-suited link corresponding to a link of the plurality of link identifiers is considered to be contained in a non-current version of the map region and respective consideration information pertaining to the respective consideration whether or not a link/considered-to-be-suited link corresponding to a link of the plurality of link identifiers is considered to be contained in a non-current version of the map region. The mapping tables may thus not only comprise information on the indications, but also on the respective consideration information.

Then, the one or more mapping tables may for instance not contain information assigning an indication and consideration information to a link identifier in case of indications that respectively indicate that a link/considered-to-be-suited link corresponding to a link identified by the link identifier is considered to be contained in a non-current version of the map region and have consideration information taking a pre-defined value, or may not contain information assigning an indication and consideration information to a link identifier in case of indications that respectively indicate that a link/considered-to-be-suited link corresponding to a link identified by the link identifier is not considered to be contained in a non-current version of the map region and have consideration information taking a pre-defined value. The consideration information may for instance be a certainty of the consideration, and the pre-defined value of the consideration information may then for instance be a value that expresses a high certainty. In this way, only clear-cut indications that are straightforwardly inferable are omitted from the mapping tables, while indications for other cases (together with the consideration information) are contained in the mapping tables.

According to an example embodiment of all aspects of the present invention, the route request information comprises a start link identifier identifying a start link in a non-current version of a first map region available to the terminal, and a target link identifier identifying a target link in a non-current version of a second map region available to the terminal, wherein the second map region is either equal to or different from the first map region, and wherein the determining of the intermediate route comprises:

checking whether a link that is considered to correspond to the start link in the non-current version of the first map region is contained in a current version of the first map region, and using this link as a start link of the intermediate route if the checking is positive; and checking whether a link that is considered to correspond to the target link in the non-current version of the second map region is contained in a current version of the second map region, and using this link as a target link of the intermediate route if the checking is positive.

The mismatch of the versions of the map regions(s) available to the terminal and to an apparatus that at least performs the determining of the intermediate route and the final route is thus not only considered when determining the final route, but already when determining the intermediate route.

Therein, checking whether a corresponding link is contained in the current version of the map region may either take into account consideration information as described above (e.g. information on a certainty of the consideration), or not. If consideration information is taken into account, a corresponding link may for instance only be considered to be contained in the current version of the map region if the related consideration information has a pre-defined value, for instance represents a high certainty. The checking may for instance be based on pre-stored mapping tables that do however not map current versions of a map region to non-current (previous) versions (as described above), but non-current versions to current versions. The mapping tables may comprise, in addition to the assignment information (e.g. in the form of indications), also respective consideration information. Furthermore, information that is inferable may be omitted from the mapping tables to save storage space as already explained above.

According to an alternative example embodiment of all aspects of the present invention, the route request information comprises a start position, a start link identifier identifying a start link in a non-current version of a first map region available to the terminal, a target position and a target link identifier identifying a target link in a non-current version of a second map region available to the terminal, wherein the second map region is either equal to or different from the first map region, and wherein the determining of the intermediate route comprises:

checking whether a link that is considered to correspond to the start link in the non-current version of the first map region is contained in a current version of the first map region, and if the checking is positive, using this link as a start link of the intermediate route; and if the checking is negative, identifying a link in the current version of the first map region that is considered to be closest to the start position and using this link as the start link of the intermediate route; and checking whether a link that is considered to correspond to the target link in the non-current version of the second map region is contained in a current version of the second map region, and if the checking is positive, using this link as a target link of the intermediate route; and if the checking is negative, identifying a link in the current version of the second map region that is considered to be closest to the target position and using this link as the target link of the intermediate route.

Also to this embodiment, the explanations presented with respect to the immediately previous embodiment apply.

According to an example embodiment of all aspects of the present invention, in case that an absolute or relative number of indications that have been used to replace respective link identifiers in the intermediate route and have a pre-defined characteristic or the absolute or relative distance in the route represented by this number exceeds a pre-defined threshold, an alternative intermediate route and correspondingly an alternative final route is determined, wherein the number of indications is in particular a total number of indications or a number of one or more indications that appear in the final route in immediate succession, and wherein the indications have the pre-defined characteristic at least if they respectively indicate that a link/considered-to-be-suited link corresponding to a link, which is identified by the link identifier replaced by the respective indication and which is contained in a current version of a map region, is not considered to be contained in a non-current-version of the map region available to the terminal.

In this way, it can be avoided that the final route is based on too many links of the current version(s) of the map region(s) (at all or in intermediate succession) that are not contained in the non-current version(s) of the map region(s) available to the terminal.

Therein, the indications further may have the pre-defined characteristic if they respectively indicate that a link/considered-to-be-suited link corresponding to a link, which is identified by the link identifier replaced by the respective indication and which is contained in a current version of a map region, is considered to be contained in a non-current-version of the map region available to the terminal but is associated with consideration information that takes a pre-defined value. The consideration information may for instance be a certainty of the consideration, and the pre-defined value may for instance be a value that expresses a low certainty.

A checking whether the absolute or relative number of indications that have been used to replace respective link identifiers in the intermediate route and have a pre-defined characteristic or the absolute or relative distance in the final route represented by thus number of indications exceeds a pre-defined threshold may for instance be performed by an apparatus that performs at least the determining of the final route (e.g. an apparatus according to an aspect of the present invention as described above), either during or after the determining of the final route, or may be performed by the terminal during or after reception of the final route.

The terminal may for instance request the determining of the alternative route, for instance from the apparatus that at least performs the determining of the intermediate route and the final route (e.g. an apparatus according to an aspect of the present invention as described above). The terminal may for instance identify one or more (or all) of the indications that have the pre-defined characteristic and may request that the alternative route avoids some or all of the identified indications.

It is to be understood that the presentation of the invention in this section is merely by way of examples and non-limiting.

Other features of the invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF EXAMPLE EMBODIMENTS OF THE INVENTION

The following description serves to deepen the understanding of the present invention and shall be understood to complement and be read together with the description of the invention as provided in the above SUMMARY section of this specification.

Figure 1:
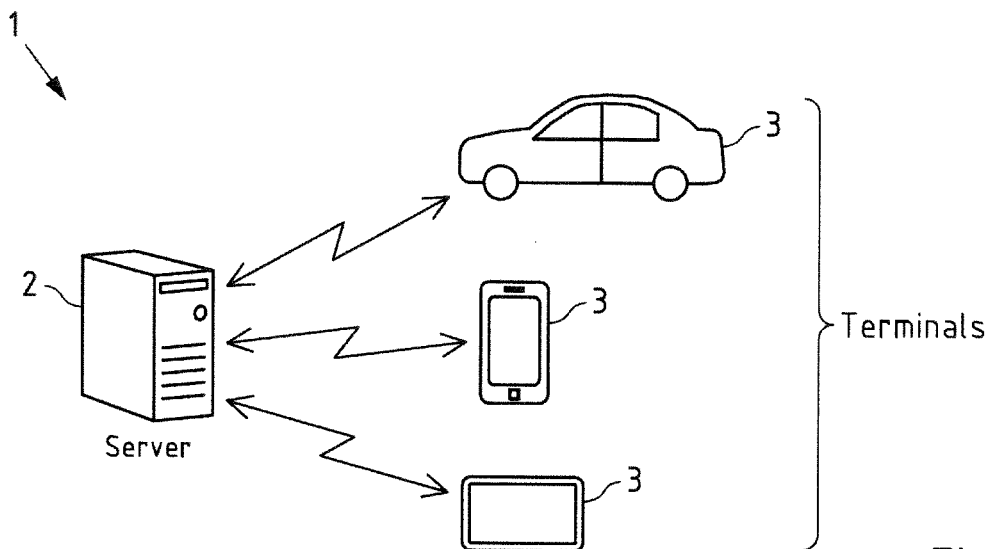
FIG. 1 a schematic block diagram of a system according to an exemplary aspect of the present invention.

FIG. 1 is a schematic high-level block diagram of a system 1 according to an exemplary aspect of the present invention. System 1 comprises a server 2, which may alternatively be embodied as a server cloud (e.g. a plurality of servers connected e.g. via the internet and providing services at least partially jointly), and a terminal 3, of which three different realizations are exemplarily shown: a car, a mobile phone and a portable navigation device (from top to bottom).

According to embodiments of the present invention, terminal 3 requests a route from server 2, and is provided with the determined route (denoted as final route) by server 2. Communication between terminal 2 and server 3 may for instance take place at least partially in a wireless fashion, e.g. based on cellular radio communication or on Wireless Local Area Network (WLAN) based communication, to name but a few examples. In this way, mobility of terminal 3 is guaranteed.

Figure 2:
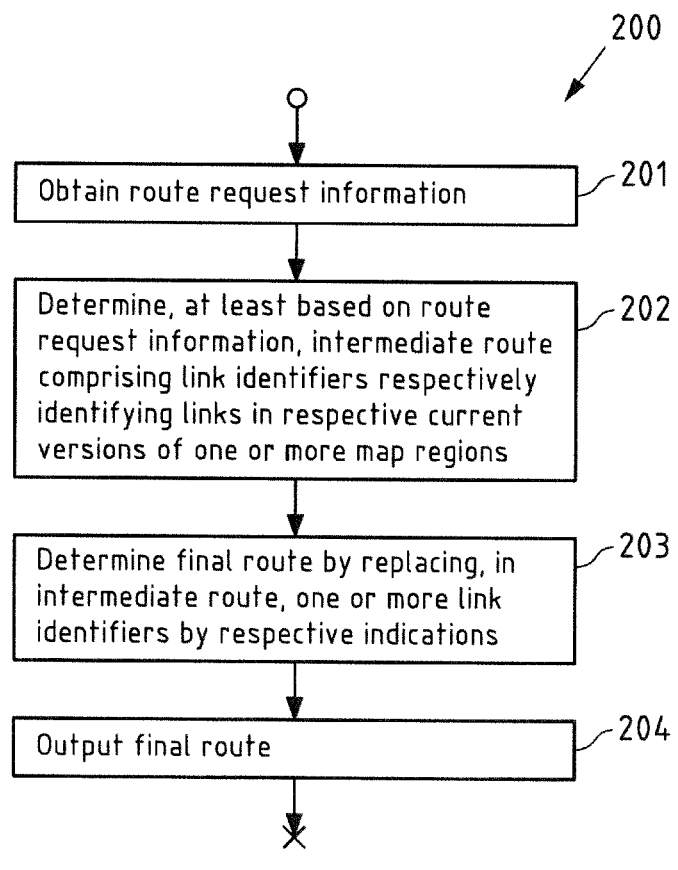
FIG. 2 a flowchart showing an example embodiment of a method according to the first exemplary aspect of the present invention, for instance performed by server 1 of FIG. 1.

FIG. 2 is a flowchart 200 showing an example embodiment of a method according to the first exemplary aspect of the present invention. This flowchart may for instance be performed by server 2 of FIG. 1.

In a first step 201, route request information is obtained (e.g. received), e.g. from terminal 3 or from another entity.

Based on at least a part of the route request information, an intermediate route is determined in a step 202. The intermediate route comprises link identifiers that respectively identify links in respective current versions of one or more map regions. The intermediate route may thus be considered to be based on current map material throughout.

In step 203, a final route is determined by replacing, in the intermediate route, one or more link identifiers by respective indications. This is done under consideration of the respective version of the one or more map regions to which the intermediate route pertains and which are available to (e.g. stored at) terminal 3. Information on these versions may for instance have been provided by the terminal 3 to server 2 with a route request that also comprised the route request information. Each of the indications respectively indicates whether or not a link corresponding to a link, which is identified by the link identifier replaced by the indication and which is contained in a current version of a map region, is considered to be contained in a non-current-version of the map region available to the terminal. Alternatively, each of the indications respectively indicates whether or not a considered-to-be-suited link corresponding to a link, which is identified by the link identifier replaced by the indication and which is contained in a current version of a map region, is considered to be contained in a non-current-version of the map region available to the terminal. The considered-to-be-suited link is a link that is considered suited to be used for a route guiding process (based on the final route) at the terminal, for instance since this link has not been reported or measured to be erroneous or problematic.

The final route is then output in a step 204, e.g. to the terminal 3 or to another entity that then forwards the final route to the terminal 3.

The exemplary flowchart 200 of FIG. 2 may for instance comprise one or more of the further features described above, for instance a check whether the final route comprises too many indications of a characteristic type and, depending on the outcome of this check, a determining of alternative intermediate and final routes.

Furthermore, the steps 202 and 203 may be performed either serial (as shown in FIG. 2), or in parallel.

Figure 3:
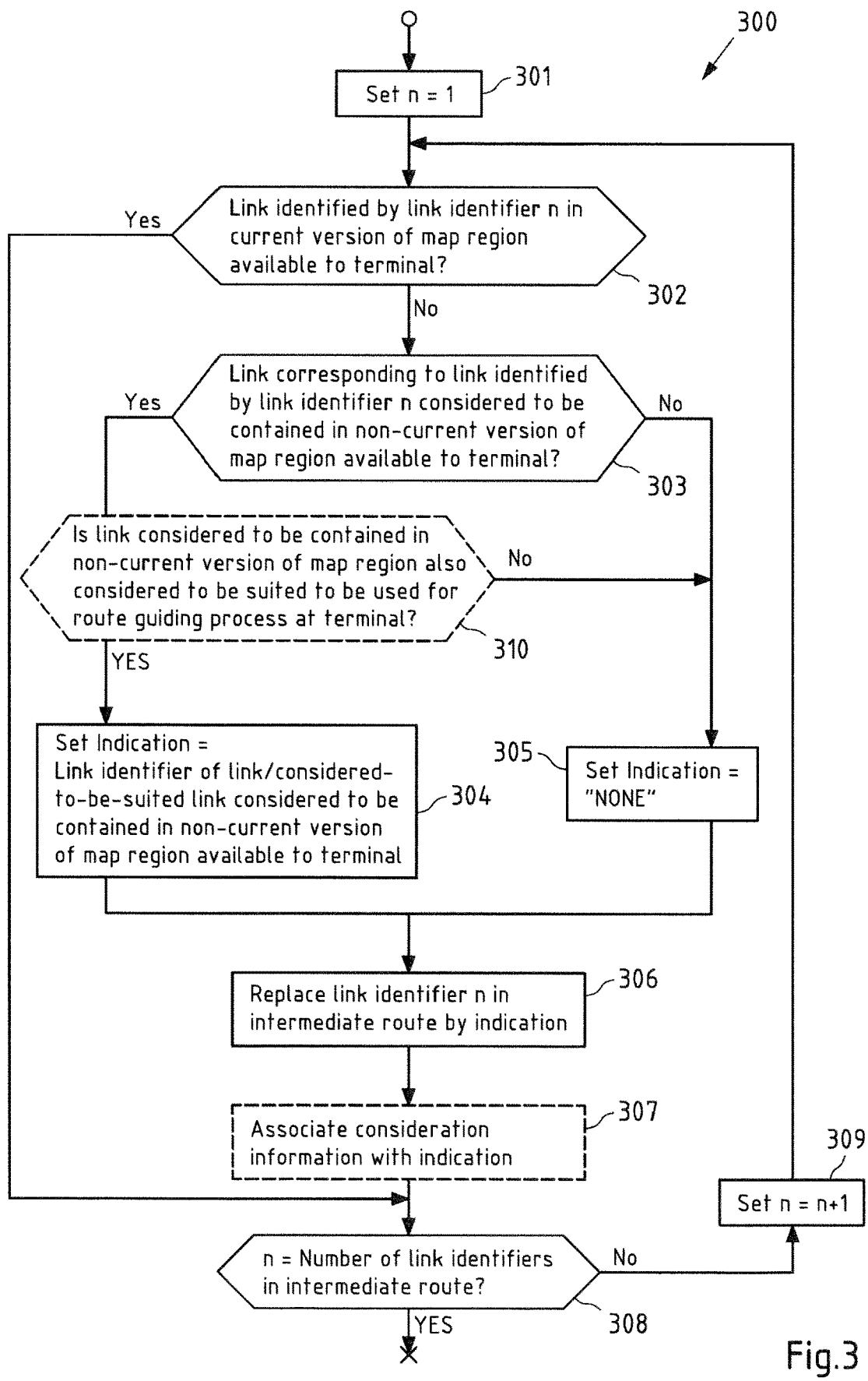
FIG. 3 a flowchart showing an example processing performed in step 203 of the flowchart of FIG. 2.

FIG. 3 is a flowchart showing an example processing performed in step 203 of the flowchart 200 of FIG. 2.

In a first step 301, a counter variable n is initialized to a value of 1.

In a step 302, it is then checked if a link identified by link identifier n (i.e. by the n-th link identifier in the intermediate route) is contained in a current version of a map region that is available to the terminal (information which respective version of map regions are available to the terminal may for instance have been provided in the route request information, see step 201 of FIG. 2). If this is the case, the link identifier n does not have to be replaced, since it can be used as it is by the terminal for navigation. Consequently, the flowchart then jumps to step 308. Otherwise, the link identifier n has to be replaced by an indication.

To this end, it is checked in step 303 whether a link corresponding to a link identified by the link identifier n is considered to be contained in a non-current version of a map region that is available to the terminal. This checking may for instance be based on one or more mapping tables as already described above.

If this is the case, the terminal should be provided with information on this link identifier (pertaining to the non-current version of the map region available to the terminal), since this link could then be used by the terminal for navigation. Consequently, in step 304, the indication is set to the link identifier of the link considered to be contained in the non-current version of the map region.

If step 303 yields a negative result, the terminal should be informed that, for the link identified by the link identifier n and stemming from the current version of the map region, no equivalent exists in the non-current version of the map region that is available to the terminal. To this end, the indication is set to a pre-defined value, here exemplarily selected as "NONE", in step 305.

In step 306, the link identifier n in the intermediate route is replaced by the indication as set in step 304 or 305.

As already explained above, as an exemplary alternative, it may not only be checked if a link is (at all) contained in the non-current version of the map region available to the terminal that corresponds to a link in the current version of the map region and is identified by a link identifier in the intermediate route, but if this link is also suited to be used for the route guiding process at the terminal. To this end, in the flowchart 300, an optional step 310 may be present, in which it is checked if the link considered to be contained in the non-current version of the map region available to the terminal (as found in step 303) is also considered to be suited to be used for the route guiding process at the terminal. This suitability check may for instance be based on a database that contains information on links that have been reported, measured and/or otherwise found to be not suited for route guiding and/or information on links that have been reported, measured and/or otherwise found to be suited for route guiding. If the check in step 310 yields a positive result, step 304 is performed. Otherwise, step 305 is performed, i.e. the non-suited link is handled as if it was not present in the non-current version of the map region available to the terminal, and will thus not be retrieved from the non-current version of the map region at the terminal.

In a further optional step 307, the indication used to replace link identifier n in step 306 is associated with consideration information, for instance by including the consideration information into the final route. The consideration information gives additional information on the consideration whether or not a link (or a considered-to-be-suited link, if optional step 310 is carried out) corresponding to the link identified by the link identifier n is considered to be contained in a non-current-version of the map region available to the terminal, e.g. pertaining to a certainty (e.g. in the form of TRUE/FALSE) of this consideration. This information may be exploited by terminal 3 when conducting a route guiding process based on the final route.

For instance, in case that the decision of step 303 was made with high certainty, the consideration information may be set to "TRUE" in step 307. This may indicate to terminal 3 that there is a perfect match for the link from the current version of the map region identified by link identifier n in the non-current version of the map region (in case that the decision of step 303 is positive and—if step 310 is also carried out—also the decision of step 310 is positive), or (if the decision in step 303 is negative) that there is absolutely no match (or no match that would be suited for the route guiding process at terminal 3, if step 310 is carried out) for the link from the current version of the map region identified by link identifier n in the non-current version of the map region.

However, in case that the decision of step 303 was made with low certainty, the consideration information may be set to "FALSE" in step 307. For instance, if the decision in step 303 (and—if step 310 is carried out—also the decision of step 310) yields a positive result, but it shall be indicated to terminal 3 that the link/considered-to-be-suited link considered to be contained in the non-current version of the map region has at least one different link attribute compared to the link identified by link identifier n, which different link attribute needs to be checked at terminal 3 to verify that this link can be used for the route guiding process, the consideration information may be set to FALSE. Similarly, if the decision in step 303 yields a negative result, but is shall be indicated to terminal 3 that, although no link/considered-to-be-suited link that corresponds to the link identified by link identifier n is considered to be contained in the non-current version of the map region, there may be another link in the non-current version of the map region that is for instance located at the same or a similar position or has at least a part in common with the link identified by link identifier n, the consideration information may be set to FALSE.

The consideration information may for instance also be set to TRUE in case that the decision in step 302 yields a positive result.

In step 308, it is checked if the counter variable n has already reached the number of link identifiers contained in the intermediate route. If this is the case, the flowchart 300 terminates. Otherwise, n is incremented by 1 in step 309, and the flowchart 300 jumps back to step 302.

Figure 4A:
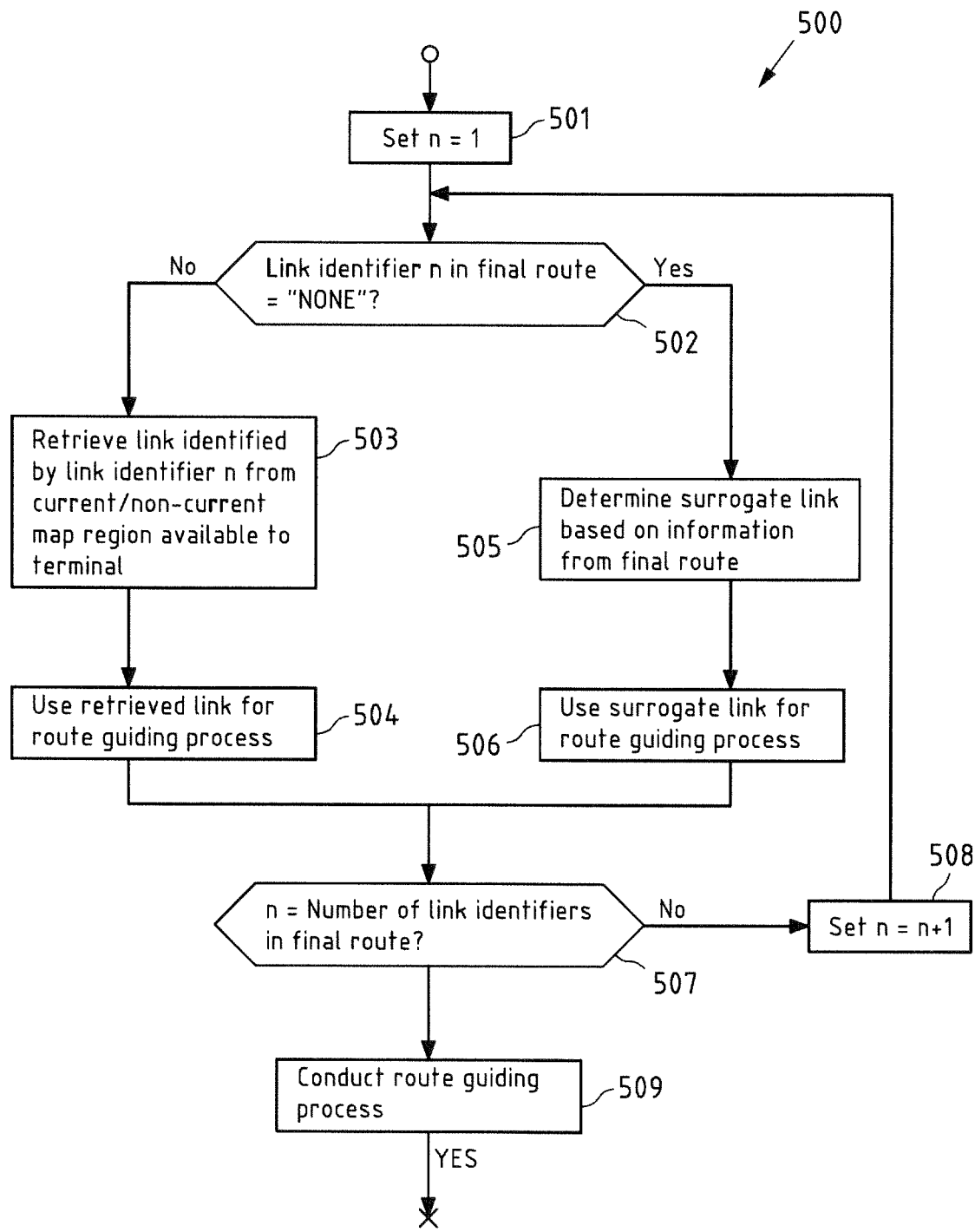
FIG. 4a a flowchart showing an example processing performed at terminal 3 of FIG. 1.

FIG. 4a is a flowchart 500 showing an example processing performed at terminal 3 of FIG. 1, for instance after a final route has been obtained from server 2. Therein, it is exemplarily assumed that the indications in the final route are not associated with consideration information. Furthermore, it is exemplarily assumed that the indications are either set to a respective identifier of a link contained in a non-current version of a map region available to terminal 3, or to a pre-defined value, here assumed as "NONE", depending on whether a link (or a considered-to-be-suited link) corresponding to a link identified by a link identifier in the intermediate route and comprised in a current version of the map region is considered to be contained in the non-current version of the map region available to terminal 3 or not. From the perspective of terminal 3, the final route thus may appear to only comprise link identifiers, which may actually identify a link available to terminal 3 or be set to the pre-defined value (here assumed as "NONE). If a link identifier takes a value different from the pre-defined value, this link identifier may identify a link in a current version of a map region available to terminal 3, or may identify a link in a non-current version of a map region available to terminal 3. In this respect, no specific processing may be required at terminal 3 to differentiate such scenarios, and for instance only a special processing may be provided for the case that the link identifier takes the pre-defined value. Furthermore, in the present example embodiment, terminal 3 is not aware of (and accordingly does not apply respectively different processing) whether an indication pertains to a link only or to a considered-to-be-suited link, as has already been explained above. Therefore, no notational differentiation between links and considered-to-be-suited link will be made in the description of FIG. 4a.

In a first step 501 a counter variable n is initialized to a value of 1.

In step 502, it is then checked if link identifier n in the final route (i.e. the n-th link identifier) has been set to the pre-determined value "NONE".

If this is not the case, step 503 is executed, and a link identified by link identifier n is retrieved from a current or non-current version of a map region available to the terminal. According to step 504, this retrieved link is used for the route guiding process. This may for instance involve at least temporarily storing the retrieved link.

If the check in step 502 yields a positive result, step 505 is executed, and a surrogate link is determined. The surrogate link may for instance be determined based on link attributes of the link (from the current version of the map region) whose link identifier in the intermediate route is replaced by the indication/link identifier n in the final route (see FIG. 6 for an example).

According to step 506, the surrogate link is used for the route guiding process, which may for instance involve at least temporarily storing the retrieved link.

In step 507, it is checked if the counter variable n has already reached the number of link identifiers contained in the final route. If this is not the case, n is incremented by 1 in step 508, and the flowchart 500 jumps back to step 502. Otherwise, the route guiding process is conducted in step 509, and subsequently, the flowchart 500 terminates. In the route guiding process of step 509, for instance the retrieved links and surrogate links stored according to steps 504 and 506 are further processed and/or presented, in sequence, e.g. under consideration of the current position of the terminal. Therein, subsequent links of the same type may for instance be processed in batches. As an alternative to step 509, the route guiding process may be conducted as part of steps 504 and 506, i.e. at least partially in parallel to the processing of the link identifiers comprised in the obtained final route.

If a surrogate link is to be displayed to a user of the terminal 3 in the route guiding process, the underlying map background may for instance be blurred or faded out or otherwise graphically altered e.g. to indicate to the user that there may be a discrepancy between the background map data and the non-available link. Additionally or alternatively, the surrogate link may be given in a different colour than the colour used for the rest of the route (e.g. represented by the links retrieved in step 503. This may alert the user of terminal 3 to pay particular attention when traversing this link during the route guiding process.

In the flowchart 500, between steps 507 and 509, there may be an optional step in which it is checked if an absolute or relative number (with respect to all links of the route that shall be used according to steps 504 and 506) of surrogate links or the absolute or relative distance (with respect to the entire distance covered by all links of the route that shall be used according to steps 504 and 506) in the route represented by this number exceeds a pre-defined threshold. The number of indications may in particular be a total number of surrogate links or a number of one or more surrogate links that appear in the final route in immediate succession. It may thus for instance be the case that a single surrogate link is considered to be too long.

If the check of this optional step should be true, for instance a request for an alternative route may be issued, e.g. towards the server 2, or a user of terminal 3 may be queried whether a request for an alternative route shall be issued or not. This query may for instance comprise information on the amount of surrogate links in terms of number or distance that triggered the query, so that a user may decide at least based on this information if an alternative route shall be requested or not. The request for an alternative route may for instance identify one or more surrogate links that shall be omitted in the alternative route.

The checking of this optional step may alternatively be performed before the step 507, in particular if an absolute number of surrogate links or an absolute distance represented by these surrogate links is checked for. As a further alternative, a user may be given an opportunity to request an alternative route during the route guiding process of step 509, e.g. after the route to be guided has been presented to the user.

Figure 4B:
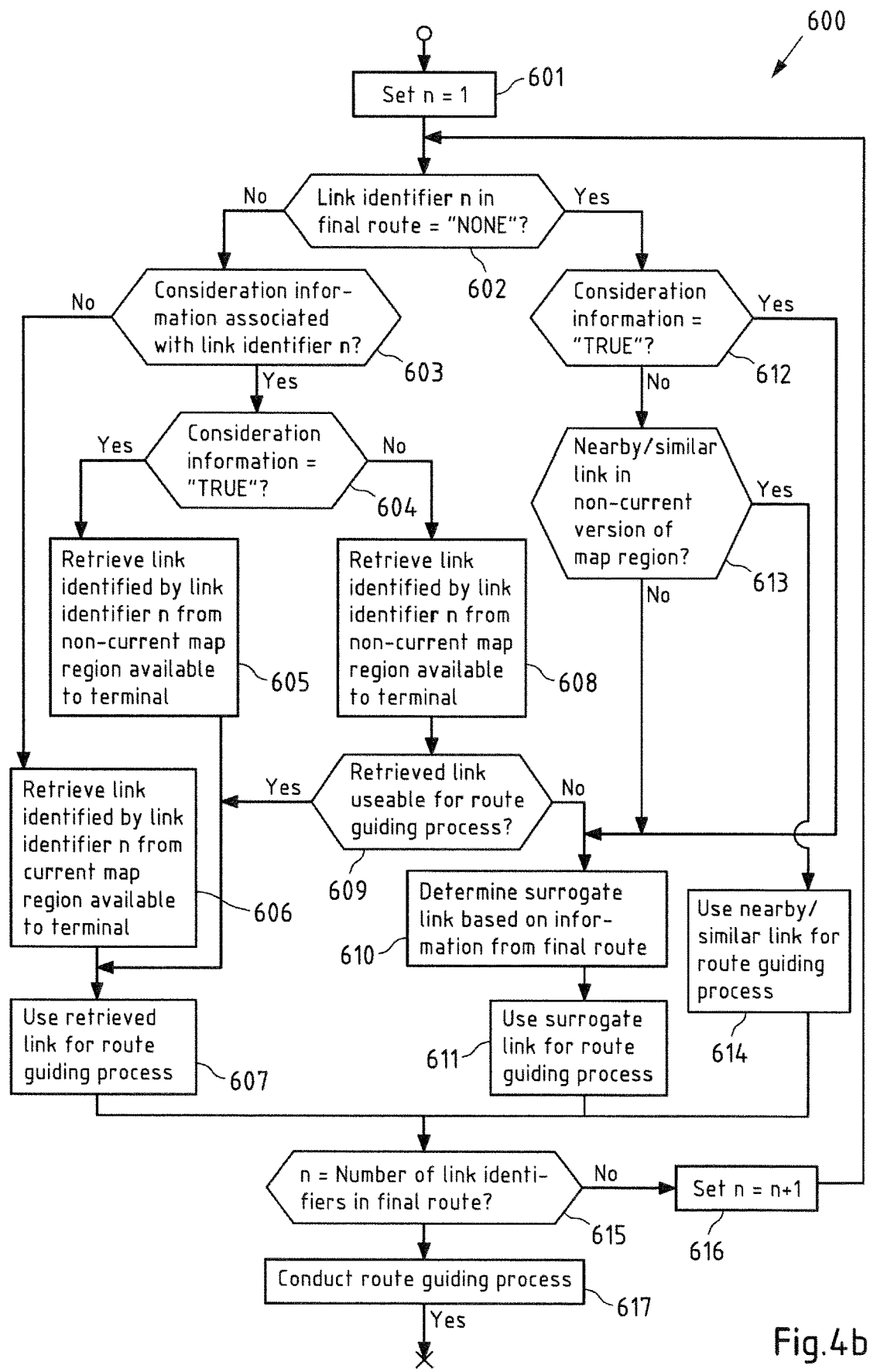
FIG. 4b a flowchart showing another example processing performed at terminal 3 of FIG. 1.

FIG. 4b is a flowchart 600 showing another example processing performed at terminal 3 of FIG. 1, for instance after a final route has been obtained from server 2.

Therein, it is now exemplarily assumed that the indications in the final route are associated with respective consideration information, which reflects a certainty of the respective consideration and can assume either the value "TRUE" or "FALSE". Furthermore, it is again exemplarily assumed that the indications are either set to a respective identifier of a link contained in a non-current version of a map region available to terminal 3, or to a pre-defined value, here assumed as "NONE", depending on whether a link (or considered-to-be-suited link) corresponding to a link identified by a link identifier in the intermediate route and comprised in a current version of the map region is considered to be contained in the non-current version of the map region available to terminal 3 or not. From the perspective of terminal 3, in the present embodiment, there is no difference between links and considered-to-be-suited links, so that no further differentiation in this respect will be made in the description of FIG. 4b.

In a first step 601 a counter variable n is initialized to a value of 1.

In step 602, it is then checked if link identifier n in the final route (i.e. the n-th link identifier) has been set to the pre-determined value "NONE".

If this is not the case, it is then checked in step 603 whether the link identifier n is associated with consideration information or not. This check takes into account that there may be link identifiers that act as indications according to the present invention (and thus respectively identify a link in a non-current map region available to terminal 3) and then may be associated with consideration information, and link identifiers that do not act as indications (and respectively identify a link in a current version of a map region available to terminal 3) and then may not be associated with consideration information. However, it is also conceivable that consideration information is also associated with link identifiers that identify links that are contained in current versions of map regions available to terminal 3, and that this consideration information is—for such link identifiers—set to a value expressing a high certainty, e.g. to the value "TRUE". Steps 603 and 606 may then be dispensed with, the "no"-branch of check 602 would directly lead to step 604, and in step 605, the link could be retrieved from either a current version or a non-current version of a map region available to terminal 3.

If it is determined in step 603 that consideration information is not associated with the link identifier n, the flowchart 600 jumps to step 606, where a link identified by the link identifier is retrieved from a current map region available to terminal 3. According to step 607, this retrieved link is then used for the route guiding process (see step 617 below), e.g. by at least temporarily storing this link.

Otherwise, it is checked in step 604 if the consideration information associated with the link identifier n is "TRUE". If this is the case, in step 605, a link identified by the link identifier n is retrieved from a non-current map region available to terminal 3, and in step 607, this retrieved link is then used for the route guiding process (see step 617), e.g. by at least temporarily storing it. This link corresponds to a link of the intermediate route that is contained in a current version of a map region.

If the check in step 604 yields a negative result, i.e. it is considered (e.g. by server 2) that a link (or considered-to-be-suited link) corresponding to a link contained in the current version of a map region and identified by a link identifier of the intermediate route is contained in a non-current version of the map region available to terminal 3, but this consideration has a low certainty ("FALSE"), the link identified by the link identifier n comprised in the final route is retrieved from the non-current version of the map region available to terminal 3 in step 608.

In step 609, it is then checked if this retrieved link is useable for the route guiding process. This check may for instance involve checking if the differences between link attributes contained for this link in the final route differ with respect to link attributes of the retrieved link only in a way that does not or only insignificantly affect the usability of the retrieved link in the route guiding process, for instance under consideration of characteristics of the vehicle that is to drive the route. This may for instance be the case if the difference in attributes only pertains to reduction of the maximum allowed weight of a vehicle that is however still met by a vehicle associated with terminal 3, or to an extension of a number of lanes from 2 to 3, to name but a few examples. If step 609 yields a positive result, the retrieved link is used for the route guiding process (see step 617) according to step 607. Otherwise, a surrogate link is determined in step 610. The surrogate link may for instance be determined as already described with reference to step 505 of FIG. 4a above. According to step 611, the surrogate link is then used for the route guiding process (see step 617).

The actions described so far occur when a link identifier in the final route is different from the pre-defined value "NONE". If this is not the case, i.e. if the check in step 602 yields a positive result, it is first checked in step 612 if the consideration information associated with the link identifier set to "NONE" is "TRUE". If this is the case, there is for sure no suitable link in the non-current version of the map region available to terminal 3 that corresponds to the link of the current version of the map region identified in the intermediate route.

Consequently, a surrogate link has to be determined in step 610 and is used for the route guiding process (see step 617) according to step 611.

If the check in step 612 turns out that the consideration information is "FALSE", this indicates that it has been considered (e.g. at server 3) that no link (or considered-to-be-suited link) exists in the non-current version of the map region available to terminal 2 that perfectly matches the link of the intermediate route contained in the current version of the map region, but that there may be a link in the non-current version of the map region that is nearby or similar (e.g. at the same position as or at least within a pre-defined distance from or comprising at least a link portion also contained in) the link of the current version of the map region that is identified by the link identifier in the intermediate route, and that thus may be suited for navigation. This may for instance concern links that have, when stepping from a previous version of a map region to a current version of the map region, been split into two links or combined with another link. Accordingly, it is checked in step 613 if such a nearby/similar link can be found in the non-current version of the map region. This check may for instance be performed based on link attributes contained in the final route for the link to which link identifier n pertains. These link attributes, e.g. in particular those link attributes that pertain to a link position and/or link geometry, may for instance be compared to respective link attributes of links comprised in the non-current version of the map region available to the terminal to identify a nearby/similar link. It may well be conceivable that this check/search yields two or more nearby/similar links contained in the non-current version of the map region available to terminal 2, e.g. two or more links of the non-current version of the map region that have been combined into a single link in the current version of the map region. In this case, e.g. all of these nearby/similar links may for instance be used for the route guiding process. The check of step 613 may additionally also comprise a check if the found nearby/similar link(s) is/are useable for the route guiding process, e.g. if their attributes impose restrictions (weight, exhaustion class) that cannot be met by the vehicle that shall drive the route or cannot be included into the route (e.g. due to an allowed driving direction that contravenes the driving direction of the route).

If the check of step 613 is positive, the nearby/similar link(s) is/are used for the route guiding process (see step 617) according to step 614. Otherwise, a surrogate link has to be determined in step 610 and is used for the route guiding process according to step 611.

In step 615, it is then checked if the counter variable n has already reached the number of link identifiers contained in the final route. If this is not the case, n is incremented by 1 in step 616, and the flowchart 600 jumps back to step 602.

Otherwise, the route guiding process is conducted in step 617, and subsequently, the flowchart 600 terminates. In the route guiding process of step 617, for instance the retrieved links, surrogate links and nearby/similar links stored according to steps 607, 611 and 614 are further processed and/or presented, in sequence, e.g. under consideration of the current position of the terminal. Therein, subsequent links of the same type may be processed in batches. As an alternative to step 617, the route guiding process may be conducted as part of steps 607, 611 and 614, i.e. at least partially in parallel to the processing of the link identifiers comprised in the obtained final route.

As explained for the flowchart 500 of FIG. 4a, also in the flowchart 600 of FIG. 4b, there may be an optional step between steps 615 and step 617 pertaining to a number of surrogate links or the distance in the route represented by them, which may lead to a request for an alternative route or at least a query to a user of terminal 3 if an alternative route shall be requested. In this respect, it is referred to the above description of flowchart 500.

Figure 6:
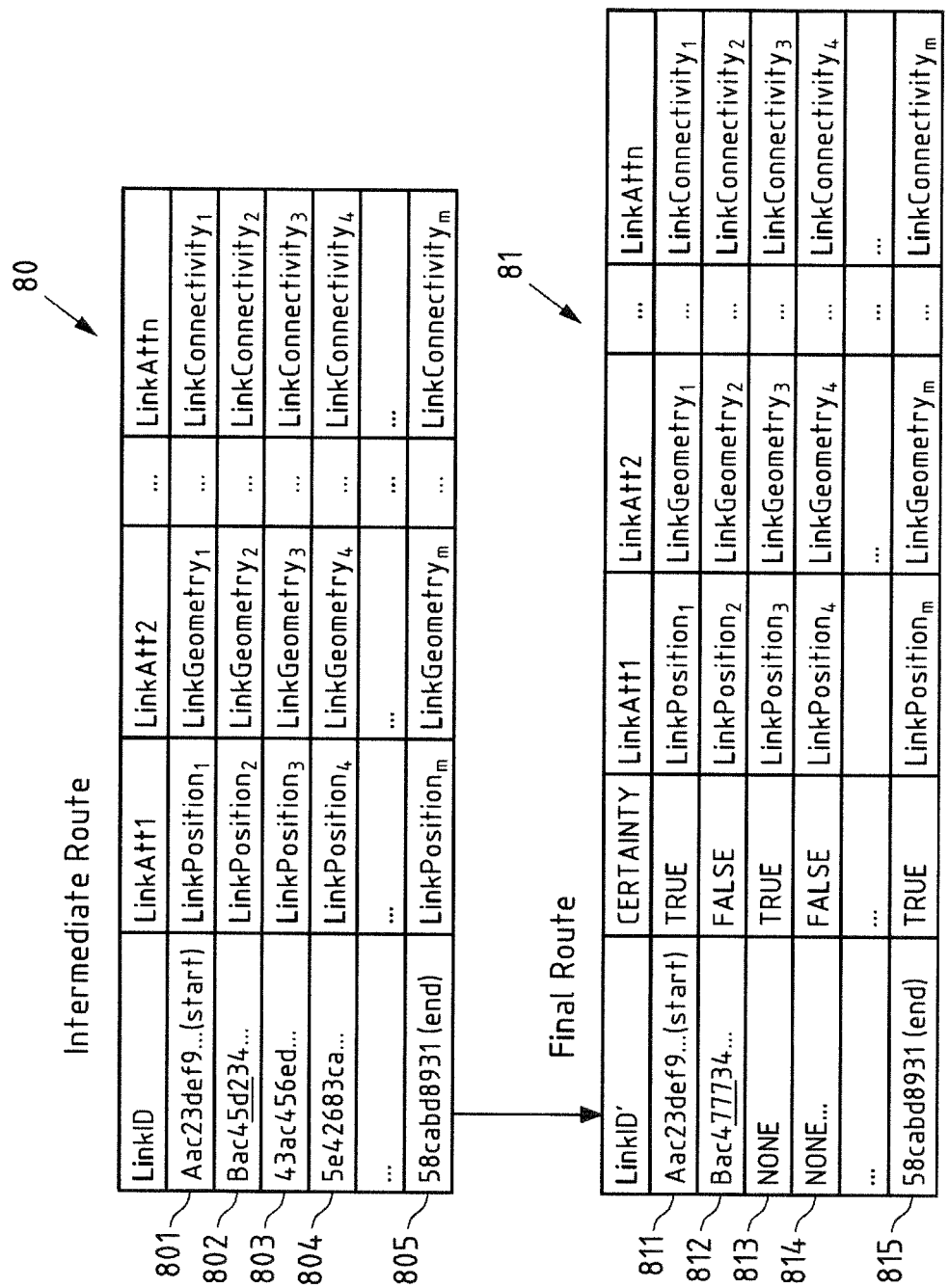
FIG. 6 an exemplary illustration of batches of links in a final route according to the present invention.

FIG. 6 shows an example of an intermediate route 80 and a final route 90 determined based on the intermediate route 80 according to the present invention. Intermediate route 80 and final route 90 would, in this form, be available at server 2 of FIG. 1, and final route 90 would be provided to terminal 3 of FIG. 1.

Intermediate route 80 comprises a plurality of m links, of which only links 801-805 are furnished with reference signs. Each of these links is identified by a link identifier (LinkID) and comprises a plurality of n attributes, of which in FIG. 8, exemplarily only a link position, a link geometry and a link connectivity are shown. Both m and n are assumed to be integer numbers. In intermediate route 80, the first link 801 is the start link of the route, and link 805 is the end link of the route. The route can be guided/navigated by following the links starting from link 801 to link 805 in the order as they appear in the intermediate route 80.

The final route 81 is obtained from the intermediate route by replacing the LinkIDs pertaining to a current version of a map region by LinkID's (serving as indications) that pertain to a non-current version of the map region available to the terminal (for the sake of simplicity of presentation, it is here exemplarily assumed that only one map region is concerned by the routes 80 and 81), as described with reference to the flowchart 300 of FIG. 3 above. Final route 81 comprises, for each link identifier LinkID', respective consideration information (here in the form of a certainty value that can take the values of TRUE or FALSE), and link attributes as in the intermediate route 80. Furthermore, each pair of LinkID' and consideration information is accompanied by link attributes, as in the intermediate route 80, yielding an entry of the final route, wherein entries 811-815 (of a total of m entries) are furnished with reference signs.

It can be seen that the start link 801 and end link 805 of the intermediate route are considered to correspond to respective links in the non-current version of the map region available to the terminal, and thus the LinkID's of these respective links (which here exemplarily equal the LinkIDs of their counterpart links in the current version of the map region) are present in the final route 81 as link identifiers of entries 811 and 815. Furthermore, the certainty values of these links have been set to TRUE.

The second link 802 of the intermediate route 80 (stemming from the current version of the map region) does not exactly equal a link contained in the non-current version of the map region available to the terminal, but has undergone changes. For instance, the link connectivity attribute may have changed. Furthermore, the link identifier has changed. Thus, in the second entry 812 of the final route 81, the link identifier Bac45d234 . . . of the intermediate route 80 has been replaced by the link identifier Bac477734 . . . , which identifies the link of the non-current version of the map region that is considered to basically correspond to the link in the current version of the map region (apart from the attribute change) identified by link identifier Bac45d234 . . . , and the certainty value is set to FALSE. It is to be noted that the attribute information of entry 812 in final route 81 corresponds to the attribute information of link 802 in the intermediate route 80. Thus although the link identifier LinkID' in entry 812 pertains to a non-current version of the map region, the attributes of entry 812 pertain to the link (Bac45d234 . . . ) contained in the current version of the map region. In this way, it indicated to terminal 3 that it needs to check if the link of its non-current version of the map region identified by link identifier Bac477734 . . . , is useable in the route guiding process, which can for instance be performed by comparing the attributes of entry 812 with the attributes stored for the link identified by LinkID' Bac477734 . . . in the non-current version of the map region.

For the third link 803 of the intermediate route 80, no corresponding link is considered to be contained in the non-current version of the map region available to the terminal. In the final route 81, the LinkID' of the third entry 813 thus has to be set to NONE, and the certainty value has been set to TRUE. This indicates to the terminal that a surrogate link shall be used. This surrogate link can be based on the attribute information provided in entry 813, which attribute information corresponds to the attribute information contained in link 803.

For the fourth link 814 of the intermediate route 80, also no corresponding link is considered to be contained in the non-current version of the map region available to the terminal, but it is considered that a nearby or similar link may exist in the non-current version of the map region available to the terminal, e.g. due to a split or merging of links. Thus, the LinkID' of the fourth entry 814 of final route 81 has been set to NONE, and the certainty value has been set to FALSE. This indicates to the terminal 3 that a search for a nearby/similar link in the non-current version of the map region is worthwhile. This search can be based on the attribute information provided in entry 814, which attribute information corresponds to the attribute information contained in link 804.

Figure 5:
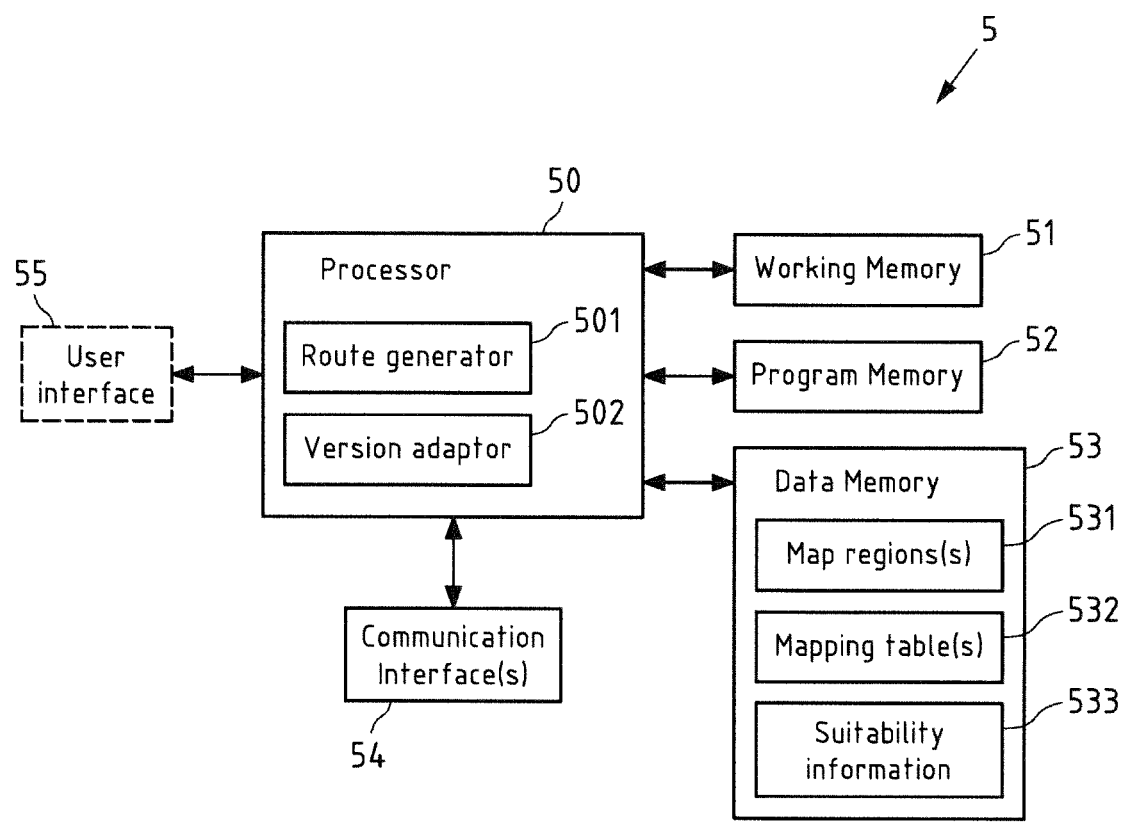
FIG. 5 a schematic block diagram of an apparatus according to an exemplary aspect of the present invention.

FIG. 5 is a schematic block diagram of an apparatus 5 according to an exemplary aspect of the present invention. Apparatus 5 may for instance represent server 2 of FIG. 1 and may be configured to perform and/or control the flowchart 200 of FIG. 2.

Apparatus 5 comprises a processor 50, working memory 51, program memory 52, data memory 53, communication interface(s) 54 and an optional user interface 55.

Apparatus 5 may for instance be configured to perform and/or control or comprise respective means (50-55) for performing and/or controlling the method according to the first exemplary aspect of the invention. Apparatus 5 may as well constitute an apparatus comprising at least one processor (50) and at least one memory (52) including computer program code, the at least one memory and the computer program code configured to, with the at least one processor, cause an apparatus (e.g. apparatus 5) at least to perform and/or control the method according to the first exemplary aspect of the invention.

Processor 50 may for instance comprise a route generator 501 and a version adaptor 502 as functional and/or structural units. Route generator 501 may for instance be configured to determine the intermediate route (see step 202 of FIG. 2). Version adaptor may for instance be configured to determine, from the intermediate route, the final route, e.g. based on information on mapping tables (see step 203 of FIG. 2). Processor 50 may for instance further control the memories 51-53, the communication interface(s) 54 and the optional user interface 55.

Processor 50 may for instance execute computer program code stored in program memory 52, which may for instance represent a computer readable storage medium comprising program code that, when executed by processor 50, causes processor 50 to perform the method according to the first exemplary aspect of the present invention.

Processor 50 (and also any other processor mentioned in this specification) may be a processor of any suitable type. Processor 50 may comprise but is not limited to one or more microprocessor(s), one or more processor(s) with accompanying one or more digital signal processor(s), one or more processor(s) without accompanying digital signal processor(s), one or more special-purpose computer chips, one or more field-programmable gate array(s) (FPGA(s)), one or more controller(s), one or more application-specific integrated circuit(s) (ASIC(s)), or one or more computer(s). The relevant structure/hardware has been programmed in such a way to carry out the described function. Processor 50 may for instance be an application processor that runs an operating system.

Program memory 52 may also be included into processor 50. This memory may for instance be fixedly connected to processor 50, or be at least partially removable from processor 50, for instance in the form of a memory card or stick. Program memory 52 may for instance be non-volatile memory. It may for instance be a FLASH memory (or a part thereof), any of a ROM, PROM, EPROM and EEPROM memory (or a part thereof) or a hard disc (or a part thereof), to name but a few examples. Memory may also comprise an operating system for processor 50. Program memory 52 may also comprise a firmware for apparatus 5.

In the apparatus 5, further a working memory 51 is present, for instance in the form of a volatile memory. It may for instance be a Random Access Memory (RAM) or Dynamic RAM (DRAM), to give but a few non-limiting examples. It may for instance be used by processor 50 when executing an operating system and/or computer program.

Data memory 53 may for instance be a non-volatile memory. It may for instance be a FLASH memory (or a part thereof), any of a ROM, PROM, EPROM and EEPROM memory (or a part thereof) or a hard disc (or a part thereof), to name but a few examples. Data memory 53 may for instance store one or more map regions 531, in particular current versions thereof, as well as one or more mapping tables 532, as has already been described above. Furthermore, data memory 53 may store suitability information 533, that e.g. indicates whether respective links of a non-current version of a map region are considered suited to be used for a route guiding process at a terminal (e.g. non-problematic and/or non-erroneous) or not Respective suitability information may for instance be available for one or more (e.g. all) non-currents versions of map regions that are stored in data memory 53. As described above, the suitability information may alternatively already be represented by the mapping tables. Nevertheless, having the suitability information separate from the mapping tables advantageously allows the suitability information to be updated independent from the mapping tables.

Communication interface(s) 54 enable apparatus 5 to communicate with other entities, e.g. with terminal 3 of FIG. 1. The communication interface(s) 54 may for instance comprise a wireless interface (e.g. a cellular radio communications interface and/or a WLAN interface) and/or a wire-bound interface, such as for instance an IP-based interface, for instance to communicate with entities via the Internet.

User interface 55 is optional and may comprise a display for displaying information to a user and/or an input device (e.g. a keyboard, keypad, touchpad, mouse, etc.) for receiving information from a user.

Some or all of the components of the apparatus 5 may for instance be connected via a bus. Some or all of the components of the apparatus 5 may for instance be combined into one or more modules.

In the following, a further detailed example embodiment of the present invention will be presented. Therein, server 2 (see FIG. 1) will be referred to as the SERVER, and terminal 3 will be referred to as the CLIENT. The one or more current-version map regions available at server 2 will be referred to as the ONLINE map, while the one or more non-current-version map regions available to the terminal 3 will be referred to as the OFFLINE map. Link identifiers will be referred to as link IDs. Link identifiers pertaining to links in the current-version map regions are denoted as LINK_ID, whereas link identifiers pertaining to links in the non-current version map regions are denoted as LINK_ID'. The indications will take the form that either a link identifier pertaining to a link in the non-current version map region is used, or the pre-defined value "NONE" is used. The consideration information will be certainty information that takes the values of "TRUE" or "FALSE".

In a navigation system in which a routing SERVER (e.g. as part of a cloud) computes routes for a CLIENT, generally, SERVER and CLIENT need to have exactly the same map versions so that a route that is computed online at the SERVER can be transferred to the CLIENT. The reason is that link IDs of map links are used to describe the chain of roads in the route so that the CLIENT can guide/navigate along that route from the SERVER.

If it was agreed to maintain a service for a navigation system provider for four years and release a map every quarter and have four different map format versions in the wild, one would need to keep 4*4*4=64 map versions in different SERVERs alive because one would have to anticipate that some device having any of this 64 variants wants to connect to the SERVERs. Also, this approach would not scale for rapid refresh (e.g. for weekly/daily releases), the number of maps to maintain would then just explode, and so would the memory, performance and maintenance problems.

To this end, example embodiments of this invention define a workflow between CLIENT and SERVER to transmit a route and handle differences between the CLIENT map and SERVER map.

Preconditions

The SERVER in the cloud only uses the latest/freshest map, called the ONLINE map. The CLIENT might have a preinstalled, potentially outdated map, call the OFFLINE map. A map is made of different REGIONS, where each of the regions may have a different version tag, e.g. the offline map might be having Germany North with version Q1/2015 and Germany South with version Q3/2015, but it can also be made only of a single REGION "whole world". For a single version tag, e.g. Q1/2015, there may for instance not be any two links with the same ID, even across multiple regions, e.g. the link ID may be world-wide unique with respect to a single version.

Compilation

During compilation, whenever a REGION is released with the latest version NEW and deployed into the SERVER to be part of the ONLINE map, a mapping of link IDs for that REGION from version NEW to the previous version PREV is generated as follows:

Each LINK_ID in NEW is mapped to (LINK_ID', CERTAINTY) with the following meaning:

LINK_ID' is NONE and CERTAINTY is TRUE:
  During compilation, these links are identified as links that describe new roads, bridges etc. in NEW that did not yet exist in the PREV version, i.e. there is for sure no link in the OFFLINE map that could be used.

LINK_ID' is NONE and CERTAINTY is FALSE:
  During compilation, these links are identified as links that describe changed topology in NEW that could also exist in the PREV version, because there is a link at the same position. However, it was not possible to provide a mapping to a PREV link, e.g. the link might have been split and corresponds to two links.

LINK_ID' is a link and CERTAINTY is FALSE:
  During compilation, these links are identified as links that describe almost the same link in the PREV version, i.e. same road, but e.g. attributes or connectivity are different LINK_ID' is a link and CERTAINTY is TRUE:
  During compilation, these links are identified as links that describe exactly the same link in the PREV version, i.e. same road, same attributes, same connectivity.

The same algorithm may be applied to generate a mapping of links from PREV to NEW, map a link LINK_ID' in PREV to (LINK_ID, CERTAINTY) where LINK_ID is NONE or names some existing link in NEW. However, instead of running the full algorithm again, one could also just invert the mapping from NEW to PREV to generate a mapping from PREV to NEW.

Hence, a mapping of links in NEW to PREV and from PREV to NEW has been generated. These artefacts get deployed to the SERVER with the ONLINE map, so that—as outlined below—the SERVER can use them to map routes between different versions.

In some embodiments, CERTAINTY could also be completely omitted or replaced by some more fine grained measurement of the CERTAINTY that the links are still the "same" with some confidence value or probability.

From experiments, it can be observed that most of the mappings are ID-preserving with CERTAINTY=TRUE, e.g. link 123 from NEW maps to 123 in version PREV. So to save space, one could completely omit saving one-to-one mappings. Whenever one would try to lookup a link LINK_ID and could not find an entry in the mapping table, one could assume that it maps to (LINK_ID, TRUE) in the other map, i.e. same LINK_ID with CERTAINTY=TRUE.

LINK_ID Resolving Algorithm from Version a to Version B

Given a link with LINK_ID_A of a REGION with version A, one might want to resolve it to a link LINK_ID of that REGION with version B. Whenever a new version of REGION was deployed, mappings between the IDs from that version to the previous one in both directions were generated and persisted. By induction, there must be a sequence of versions V_1=A, V_2, ..., V_n=B, where for each consecutive pair of versions V_i to V_{i+1}, one generated and persisted a mapping of link IDs. In a simple case, if A and B are consecutive versions, one simply would have V_1=A and V_2=B.

Then, the following algorithm could be run:
Start with i=1, LINK_ID=LINK_ID_A and CERTAINTY=TRUE
Repeat the following process while i<n and LINK_ID is not NONE:
   Map LINK_ID from version V_i to V_{i+1} using the mapping table to retrieve (LINK_ID', CERTAINTY')
   Set LINK_ID=LINK_ID'
   If CERTAINTY' is FALSE, then set CERTAINTY=FALSE
Return (LINK_ID, CERTAINTY) as the mapping of LINK_ID_A in version B.

This algorithm basically chains all mappings from V_1 to V_n. The final CERTAINTY is only TRUE if all intermediate mapping had CERTAINTY=TRUE.

Alternate/Enhanced Approach

Instead of storing only mappings between two consecutive mappings, one might also compute and persist mappings for the latest ONLINE to ALL previous versions and then would not have to chain mappings, but could directly use a single mapping table between two versions. The downside of this approach is that it is computational more expensive during compilation, but later is faster when serving routes since it is a single lookup instead of a chain of lookups.

Client-Side Route Request

For a route request, the CLIENT may for instance know:
START_POSITION: The coordinates of the start point, e.g. the current position of the CLIENT.
START_LINK_ID': The ID' of the road link of the START_POSITION in its OFFLINE map, e.g. determined by map matching of START_POSITION at the CLIENT.
TARGET_POSITION: The coordinates of the target point, e.g. determined by geocoding of the target address.
TARGET_LINK_ID': The ID' of the road link of the TARGET_POSITION in its OFFLINE map, e.g. determined by map matching of TARGET_POSITION at the CLIENT or as a direct result of geocoding.

The CLIENT sends a routing request to the routing server with START_POSITION, START_LINK_ID', TARGET_POSITION, TARGET_LINK_ID', and a list of versions of all the REGIONS of its OFFLINE map.

Server-Side Route Computation

The SERVER receives the request from the CLIENT.

The SERVER uses the LINK_ID RESOLVING ALGORITHM to resolve START_LINK_ID' from the version the CLIENT has transmitted for the REGION of START_LINK_ID' to the corresponding START_LINK_ID in the version of the ONLINE map. If a mapping could not be found or is having CERTAINTY=FALSE, the SERVER uses map matching to find the closest link in the ONLINE map and uses it for START_LINK_ID. The SERVER does exactly the same to resolve TARGET_LINK_ID' in OLD to TARGET_LINK_ID in NEW.

The SERVER computes a route from START_LINK_ID to TARGET_LINK_ID in the ONLINE map using the desired routing mode, e.g. traffic optimized, fastest, shortest, etc. The routing result now contains LINK_IDs of all the links that describe the route in the ONLINE map.

For each LINK_ID, the server uses the LINK_ID RESOLVING ALGORITHM to resolve the LINK_ID in the version of the ONLINE map to an LINK_ID' in the version the CLIENT transmitted for the REGION that contains link LINK_ID. The LINK_ID in the routing result is substituted with LINK_ID' and also the CERTAINTY is added for each link.

The SERVER transmits the route to the CLIENT.

Client-Side Behaviour

The CLIENT receives the route from the SERVER. For all the links (LINK_ID', CERTAINTY) in the route response, the following logic is applied on the client:

LINK_ID' is NONE and CERTAINTY is TRUE:
   It means the CLIENT is surely not having this link in its OFFLINE map and needs to fall-back to a solution (e.g. a surrogate link) that does not use the OFFLINE map data here, but still guides/navigates along that link.

LINK_ID' is NONE and CERTAINTY is FALSE:
   It means the CLIENT could have this link or a part of it in its OFFLINE map and needs to check on its OFFLINE map whether there is a probably partially matching link at the same or similar geometry that is navigable in the route (e.g. legally traversable by a vehicle when following the route) and that link's ID' is put in the route. If no partially matching link is available, fall-back to a solution (e.g. a surrogate link) that does not use the OFFLINE map data here, but still guides/navigates along that link (which is navigable in the route).

LINK_ID' is a link and CERTAINTY is FALSE:
   It means the CLIENT is surely having a link LINK_ID' in its OFFLINE map, but it has to verify with its OFFLINE map data whether this is really the correct link, i.e. navigable in the route. If the link is not navigable, NONE is put in the route and hence fall-back to a solution that does not use the OFFLINE map data here, but still guides/navigates along that link (which is navigable in the route).

LINK_ID' is a link and CERTAINTY is TRUE:
   It means the CLIENT is surely having a link LINK_ID' in its OFFLINE map and that this one has to be used.

If the route contains stretches of NONE segments, the following fall-back solutions can for instance be applied:
   Guide/navigate through this unknown link and make the user aware of his locally outdated map.
   Render the link with a special colour and blur/fade out the underlying map a bit to emphasize there is a change.
   Optionally, if the stretch of NONE segments is too long or complex (e.g. according to a pre-defined complexity criterion), the CLIENT might decide to offer the user an alternative that contains a less number of NONE segments. For example, the CLIENT might query the SERVER for another route between start and end point and send the geometry of the too long NONE segments to tell SERVER what link to avoid. Alternatively, the SERVER may decide that a determined route contains one or more stretches of too long or complex NONE segments and may for instance then, before providing this final route to the CLIENT, determine an alternative route.

Server Side Controlled Behaviour:

In example embodiments of the invention, e.g. where road links have been reported as problematic, the server could manipulate the LinkID's and/or CERTAINTY in order to force clients into specific behaviours.

For instance, links of a route that have been reported as problematic may be assigned a respective LinkID' of NONE and a CERTAINTY of TRUE, thus causing these links to be treated at the CLIENT as links that are not available in the CLIENT's OFFLINE map and thus have to be determined based on information (e.g. link attributes) contained in the route. These links, although basically contained in the CLIENT's OFFLINE map, are thus replaced with links that are based on information provided to the CLIENT in the route.

In the present specification, any presented connection in the described embodiments is to be understood in a way that the involved components are operationally coupled. Thus, the connections can be direct or indirect with any number or combination of intervening elements, and there may be merely a functional relationship between the components.

Moreover, any of the methods, processes and actions described or illustrated herein may be implemented using executable instructions in a general-purpose or special-purpose processor and stored on a computer-readable storage medium (e.g., disk, memory, or the like) to be executed by such a processor. References to a 'computer-readable storage medium' should be understood to encompass specialized circuits such as FPGAs, ASICs, signal processing devices, and other devices.

The expression "A and/or B" is considered to comprise any one of the following three scenarios: (i) A, (ii) B, (iii) A and B. Furthermore, the article "a" is not to be understood as "one", i.e. use of the expression "an element" does not preclude that also further elements are present. The term "comprising" is to be understood in an open sense, i.e. in a way that an object that "comprises an element A" may also comprise further elements in addition to element A.

It will be understood that all presented embodiments are only exemplary, and that any feature presented for a particular example embodiment may be used with any aspect of the invention on its own or in combination with any feature presented for the same or another particular example embodiment and/or in combination with any other feature not mentioned. In particular, the example embodiments presented in this specification shall also be understood to be disclosed in all possible combinations with each other, as far as it is technically reasonable and the example embodiments are not alternatives with respect to each other. It will further be understood that any feature presented for an example embodiment in a particular category (method/apparatus/computer program) may also be used in a corresponding manner in an example embodiment of any other category. It should also be understood that presence of a feature in the presented example embodiments shall not necessarily mean that this feature forms an essential feature of the invention and cannot be omitted or substituted.

The sequence of all method steps presented above is not mandatory, also alternative sequences may be possible. Nevertheless, the specific sequence of method steps exemplarily shown in the figures shall be considered as one possible sequence of method steps for the respective embodiment described by the respective figure.

The invention has been described above by means of example embodiments. It should be noted that there are alternative ways and variations which are obvious to a skilled person in the art and can be implemented without deviating from the scope of the appended claims.

The invention claimed is:

1. A method comprising:
   obtaining route request information characterizing a route to be provided to a terminal;
   determining, at least partially based on the route request information, an intermediate route comprising a plurality of link identifiers respectively identifying links in respective current versions of a map region;
   determining a final route by replacing, in the intermediate route, one or more link identifiers by respective indications,
   wherein the one or more link identifiers include attribute information for the links, and wherein each indication of the indications respectively indicates whether or not a link or considered-to-be-suited link corresponding to the link, which is identified by the link identifier replaced by the indication and which is contained in the current version of the map region, is considered to be contained in a non-current-version of the map region available to the terminal, wherein the considered-to-be-suited-link is the link that is considered to be suited to be used for a route guiding process at the terminal; and
   outputting the final route.

2. The method according to claim 1, wherein in case that the link or considered-to-be-suited link corresponding to the link, which is identified by the link identifier replaced by the indication and which is contained in the current version of the map region, is considered to be contained in the non-current version of the map region, the indication comprises or consists of a link identifier identifying this link or considered-to-be-suited link considered to be contained in the non-current version of the map region.

3. The method according to claim 1, wherein in case that the link or considered-to-be-suited link corresponding to the link, which is identified by the link identifier replaced by the indication and which is contained in the current version of the map region, is not considered to be contained in the non-current version of the map region, a predefined or empty information is contained in or constitutes the indication.

4. The method according to claim 1, wherein each indication of the indications is associated with respective consideration information pertaining to the consideration whether or not the link or considered-to-be-suited link corresponding to the link, which is identified by the link identifier replaced by the indication and which is contained in the current version of the map region, is considered to be contained in a non-current-version of the map region.

5. The method according to claim 4, wherein the respective consideration information is indicative of a certainty of the respective consideration and/or wherein the respective consideration information, together with the respective indication it is associated with or alone, indicates a graduation of the respective consideration with more than two levels.

6. The method according to claim 5, wherein the respective consideration information, together with the respective indication it is associated with or alone, indicates a graduation of the respective consideration with one or more of the following four levels:
- a first level indicating that no link or considered-to-be-suited link corresponding to the link, which is identified by the link identifier replaced by the indication and which is contained in the current version of the map region, is considered to be contained in a non-current version of the map region available to the terminal;
- a second level indicating that no link or considered-to-be-suited link corresponding to a link, which is identified by the link identifier replaced by the indication and which is contained in the current version of the map region, is considered to be contained in a non-current version of the map region available to the terminal, but that at least one link or considered-to-be-suited link that is at the same position as or at least within a pre-defined distance from or comprises at least a link portion also contained in the link, which is identified by the link identifier replaced by the indication and which is contained in a current version of the map region, is considered to be contained in the respective non-current-version map region available to the terminal;
- a third level indicating that the link or considered-to-be-suited link corresponding to the link, which is identified by the link identifier replaced by the indication and which is contained in the current version of the map region, is considered to be contained in a non-current version of the map region available to the terminal, although at least one characteristic of both links differs; and
- a fourth level indicating that the link or considered-to-be-suited link corresponding to the link, which is identified by the link identifier replaced by the indication and which is contained in the current version of the map region, is considered to be contained in a non-current version of the map region available to the terminal.

7. The method according to claim 1, wherein at least one of the indications is determined based on one or more mapping table that assign, to a plurality of link identifiers that respectively identify links in a current-version of a map region, respective indications respectively indicating whether or not the link or considered-to-be-suited link corresponding to the link of the plurality of link identifiers is considered to be contained in a non-current version of the map region.

8. The method according to claim 4, wherein at least one of the indications and its associated consideration information are determined based on one or more mapping tables that assign, to a plurality of link identifiers that respectively identify links in a current-version of a map region, respective indications respectively indicating whether or not the link or considered-to-be-suited link corresponding to the link of the plurality of link identifiers is considered to be contained in a non-current version of the map region and respective consideration information pertaining to the respective consideration whether or not the link or considered-to-be-suited link corresponding to the link of the plurality of link identifiers is considered to be contained in a non-current version of the map region.

9. The method according to claim 1, wherein the route request information comprises a start link identifier identifying a start link in a non-current version of a first map region available to the terminal, and a target link identifier identifying the target link in a non-current version of a second map region available to the terminal, wherein the second map region is either equal to or different from the first map region, and wherein the determining of the intermediate route comprises:
- checking whether the link that is considered to correspond to the start link in the non-current version of the first map region is contained in a current version of the first map region, and using this link as a start link of the intermediate route if the checking is positive; and
- checking whether the link that is considered to correspond to the target link in the non-current version of the second map region is contained in a current version of the second map region, and using this link as a target link of the intermediate route if the checking is positive, or wherein the route request information comprises a start position, a start link identifier identifying a start link in a non-current version of a first map region available to the terminal, a target position and a target link identifier identifying a target link in a non-current version of a second map region available to the terminal, wherein the second map region is either equal to or different from the first map region, and wherein the determining of the intermediate route comprises:
- checking whether the link that is considered to correspond to the start link in the non-current version of the first map region is contained in a current version of the first map region, and
- if the checking is positive, using this link as a start link of the intermediate route; and
- if the checking is negative, identifying the link in the current version of the first map region that is considered to be closest to the start position and using this link as the start link of the intermediate route; and
- checking whether the link that is considered to correspond to the target link in the non-current version of the second map region is contained in a current version of the second map region, and
- if the checking is positive, using this link as a target link of the intermediate route; and
- if the checking is negative, identifying the link in the current version of the second map region that is considered to be closest to the target position and using this link as the target link of the intermediate route.

10. The method according to claim 1, wherein in case that an absolute or relative number of indications that have been used to replace respective link identifiers in the intermediate route and have a pre-defined characteristic or the absolute or relative distance in the final route represented by this number of indications exceeds a pre-defined threshold, an alternative intermediate route and correspondingly an alternative final route is determined, wherein the number of one or more indications is in particular a total number of indications or a number of indications that appear in the final route in immediate succession, and wherein the indications have the pre-defined characteristic at least if they respectively indicate that the link or considered-to-be-suited link corresponding to the link, which is identified by the link identifier replaced by the respective indication and which is contained in the current version of the map region, is not considered to be contained in a non-current-version of the map region available to the terminal.

11. The method according to claim 10, wherein the indications further have the pre-defined characteristic if they respectively indicate that the link or considered-to-be-suited link corresponding to the link, which is identified by the link identifier replaced by the respective indication and which is contained in the current version of the map region, is considered to be contained in a non-current-version of the map region available to the terminal but is associated with consideration information that takes a pre-defined value.

12. The method according to claim 10, wherein a checking whether the absolute or relative number of indications that have been used to replace respective link identifiers in the intermediate route and have a pre-defined characteristic or the absolute or relative distance in the final route represented by this number of indications exceeds a pre-defined threshold is performed by an apparatus that performs at least the determining of the final route, either during or after the determining of the final route, or is performed by the terminal during or after reception of the final route.

13. An apparatus comprising:
   at least one processor; and
   at least one memory including computer program code for one or more programs,
   the at least one memory and the computer program code configured to, with the at least one processor, cause the apparatus to perform at least the following,
   obtain route request information characterizing a route to be provided to a terminal;
   determine, at least partially based on the route request information, an intermediate route comprising a plurality of link identifiers respectively identifying links in respective current versions of a map region;
   determine a final route by replacing, in the intermediate route, one or more link identifiers by respective indications,
   wherein the one or more link identifiers include attribute information for the links, and wherein each indication of the indications respectively indicates whether or not a link or considered-to-be-suited link corresponding to the link, which is identified by the link identifier replaced by the indication and which is contained in the current version of the map region, is considered to be contained in a non-current-version of the map region available to the terminal, wherein the considered-to-be-suited-link is the link that is considered to be suited to be used for a route guiding process at the terminal; and
   outputting the final route.

14. The apparatus of claim 13, wherein in case that the link or considered-to-be-suited link corresponding to the link, which is identified by the link identifier replaced by the indication and which is contained in the current version of the map region, is considered to be contained in the non-current version of the map region, the indication comprises or consists of a link identifier identifying this link or considered-to-be-suited link considered to be contained in the non-current version of the map region.

15. The apparatus of claim 13, wherein in case that the link or considered-to-be-suited link corresponding to the link, which is identified by the link identifier replaced by the indication and which is contained in the current version of the map region, is not considered to be contained in the non-current version of the map region, a predefined or empty information is contained in or constitutes the indication.

16. The apparatus of claim 13, wherein each indication of the indications is associated with respective consideration information pertaining to the consideration whether or not the link or considered-to-be-suited link corresponding to the link, which is identified by the link identifier replaced by the indication and which is contained in the current version of the map region, is considered to be contained in a non-current-version of the map region.

17. The apparatus of claim 16, wherein the respective consideration information is indicative of a certainty of the respective consideration and/or wherein the respective consideration information, together with the respective indication it is associated with or alone, indicates a graduation of the respective consideration with more than two levels.

18. A non-transitory computer-readable storage medium carrying one or more sequences of one or more instructions which, when executed by one or more processors, cause an apparatus to at least perform the following steps:
   obtaining route request information characterizing a route to be provided to a terminal;
   determining, at least partially based on the route request information, an intermediate route comprising a plurality of link identifiers respectively identifying links in respective current versions of a map region;
   determining a final route by replacing, in the intermediate route, one or more link identifiers by respective indications,
   wherein the one or more link identifiers include attribute information for the links, and wherein each indication of the indications respectively indicates whether or not a link or considered-to-be-suited link corresponding to the link, which is identified by the link identifier replaced by the indication and which is contained in the current version of the map region, is considered to be contained in a non-current-version of the map region available to the terminal, wherein the considered-to-be-suited-link is the link that is considered to be suited to be used for a route guiding process at the terminal; and
   outputting the final route.

19. The non-transitory computer-readable storage medium of claim 18, wherein in case that the link or considered-to-be-suited link corresponding to the link, which is identified by the link identifier replaced by the indication and which is contained in the current version of the map region, is considered to be contained in the non-current version of the map region, the indication comprises or consists of the link identifier identifying this link or considered-to-be-suited link considered to be contained in the non-current version of the map region.

20. The non-transitory computer-readable storage medium of claim 18, wherein in case that the link or considered-to-be-suited link corresponding to the link, which is identified by the link identifier replaced by the indication and which is contained in the current version of the map region, is not considered to be contained in the non-current version of the map region, a predefined or empty information is contained in or constitutes the indication.

* * * * *